(12) United States Patent
Yao et al.

(10) Patent No.: US 11,299,674 B2
(45) Date of Patent: Apr. 12, 2022

(54) LIQUID CRYSTAL COMPOSITION AND DISPLAY DEVICE THEREOF

(71) Applicant: Jiangsu Hecheng Display Technology Co., Ltd., Yangzhong (CN)

(72) Inventors: Lifang Yao, Yangzhong (CN); Di He, Yangzhong (CN); Rui Jin, Yangzhong (CN)

(73) Assignee: Jiangsu Hecheng Display Technology Co., Ltd., Yangzhong (CN)

( * ) Notice: Subject to any disclaimer, the term of this patent is extended or adjusted under 35 U.S.C. 154(b) by 73 days.

(21) Appl. No.: 16/592,104

(22) Filed: Oct. 3, 2019

(65) Prior Publication Data

US 2020/0131440 A1   Apr. 30, 2020

(30) Foreign Application Priority Data

Oct. 30, 2018   (CN) .................. 201811272325.X

(51) Int. Cl.
  *G02F 1/1333*   (2006.01)
  *C09K 19/34*    (2006.01)
  *C09K 19/30*    (2006.01)
  *C09K 19/06*    (2006.01)
  *C09K 19/12*    (2006.01)

(52) U.S. Cl.
  CPC ........ *C09K 19/3402* (2013.01); *C09K 19/062* (2013.01); *C09K 19/12* (2013.01); *C09K 19/3003* (2013.01); *C09K 19/3028* (2013.01); *C09K 19/3066* (2013.01); *C09K 2019/301* (2013.01); *C09K 2019/3009* (2013.01); *C09K 2019/3016* (2013.01); *C09K 2019/3037* (2013.01); *C09K 2019/3422* (2013.01)

(58) Field of Classification Search
  CPC .. C09K 19/3402; C09K 19/062; C09K 19/12; C09K 19/3003; C09K 19/3028; C09K 19/3066; C09K 2019/3009; C09K 2019/301; C09K 2019/3016; C09K 2019/3037; C09K 2019/3422; G02F 1/1333
  See application file for complete search history.

(56) References Cited

U.S. PATENT DOCUMENTS 6,235,355 B1 *  5/2001  Haseba ................ C09K 19/406
                                                       428/1.1
7,842,358 B2   11/2010  Czanta et al.
7,951,432 B2    5/2011  Tanaka
(Continued)

FOREIGN PATENT DOCUMENTS

CN    101565624 A   10/2009
CN    102056882 A    5/2011
(Continued)

*Primary Examiner* — Geraldina Visconti
(74) *Attorney, Agent, or Firm* — Hoffmann & Baron, LLP

(57) ABSTRACT

The present invention provides a liquid crystal composition comprising: at least one compound of general Formula I; at least one compound of general Formula II; at least one compound of general Formula M and at least one compound of general Formula N. The present invention also provides a liquid crystal display device comprising the liquid crystal composition. The liquid crystal composition provided in the present invention has a higher optical anisotropy, a higher clearing point, a higher dielectric anisotropy, a high transmittance and a larger average elastic constant. When the liquid crystal composition is used in the IPS liquid crystal display device, the transmittance of the display device can be effectively improved, so that the display device has a good display performance while also having good energy-saving and environment-friendly characteristics.

11 Claims, No Drawings

(56) References Cited

U.S. PATENT DOCUMENTS

| | | | |
|---|---|---|---|
| 11,193,063 B2 * | 12/2021 | Han | ................. C07D 319/06 |
| 2013/0207038 A1 | 8/2013 | Haensel et al. | |
| 2018/0022999 A1 * | 1/2018 | Ookawa | ............... C07C 43/184 |
| | | | 349/33 |
| 2020/0255738 A1 | 8/2020 | Han et al. | |

FOREIGN PATENT DOCUMENTS

| | | | | |
|---|---|---|---|---|
| CN | 103320142 A | | 9/2013 | |
| CN | 103740377 A | | 4/2014 | |
| CN | 103756686 A | | 4/2014 | |
| CN | 104293357 A | | 1/2015 | |
| CN | 105018108 | * | 11/2015 | ............ C09K 19/44 |
| CN | 104293358 B | * | 7/2016 | ........... G02F 1/1333 |
| CN | 108219802 A | | 6/2018 | |
| CN | 109134423 A | | 1/2019 | |
| EP | 1 026 142 A1 | | 8/2000 | |
| JP | 2002156619 A | | 5/2002 | |
| WO | 2010/017868 A1 | | 2/2010 | |

* cited by examiner

LIQUID CRYSTAL COMPOSITION AND DISPLAY DEVICE THEREOF

CROSS-REFERENCE TO RELATED APPLICATIONS

This application claims priority to and benefit of Chinese Patent Application No. 201811272325.X filed on Oct. 30, 2018. The contents of the above application are hereby expressly incorporated by reference in its entirety into the present application, including the contents and teachings of any references contained therein.

TECHNICAL FIELD

The present invention relates to the field of liquid crystal material, particularly to a liquid crystal composition and a liquid crystal display device comprising the same.

BACKGROUND ARTS

Liquid crystal displays (LCDs) have gained rapid development due to their small size, light weight, low power consumption and excellent display quality, and in particular, have been widely used in portable electronic information products. With the increase in the size of liquid crystal screens for portable computers, office applications, and video applications, there are still some problems (such as improving viewing angle characteristics, improving the response speed, increasing contrast, and increasing transmittance) to be solved, in order to enable liquid crystal displays to be used for large-screen displays and eventually to replace cathode ray tubes (CRTs). The narrow viewing angle of LCD means that the contrast is significantly reduced when viewed away from the normal direction of the liquid crystal cell, while a large viewing angle leads to the occurrences of the gray scale and color inversion, which seriously affect the display quality of LCD, and thus viewing angle issues become the major technical obstacle to the replacement of CRT with LCD.

The viewing angle issues of LCD are determined by the working principles of liquid crystal. Liquid crystal molecules themselves are rod-shaped and the different alignments of liquid crystal molecules correspond to different optical anisotropies.

The smaller the angle between incident light and liquid crystal molecules, the smaller the birefringence, and vice versa. The different angles between the lights incident on the liquid crystal cell with various angles away from the normal direction of the display screen and the director of liquid crystal molecules results in different effective optical path differences Δn*d at different viewing angles. However, the optimal optical path difference of the liquid crystal cell is designed vertically to the normal direction of the liquid crystal cell. In the case of oblique incidence, the minimum transmittance of the light increases with the angle, while the contrast decreases. When the angle is large enough, it even causes the occurrence of contrast reversal phenomenon.

Many types of LCD (such as, optically compensated bend (OCB) mode, in-plane switching (IPS) mode, fringe field switching (FFS) mode and multi-domain vertical alignment (MVA) mode) have been proposed so far for solving the viewing angle issues. These LCD modes have their own advantages and limitations. The MVA mode has high contrast and fast response, but it requires a biaxial compensation film and two elliptical polarizers, resulting in the higher cost. In the case of the OCB mode, stable control is difficult to be maintained under the AC voltage, and the transmittances for the three kinds of monochromatic light (red, green and blue) are also different. It is known that the molecules in the liquid crystal cell are aligned parallel to the substrates in the absence of an electric field. In order to achieve a bend alignment, a voltage is applied to the cell for a few seconds to prearrange the liquid crystal molecules and then a lower voltage is applied to maintain the alignment, which is inconvenient for use. The IPS mode requires only a linear polarizer without needing a compensation film, but its response speed is too slow to display a fast moving picture. Since the IPS mode and the FFS mode are simple in manufacture and have a wide viewing angle, they are the most attractive methods for improving the viewing angle characteristics and achieving large-area display.

In the early 1970s, experimental studies have been conducted on the basic electro-optical characteristics of the uniformly aligned and twisted, IPS nematic liquid crystal mode, which features in that a pair of electrodes is formed on one substrate and the other substrate does not have electrode disposed thereon, and the alignment of the liquid crystal molecules is controlled by a transverse electric field applied between the pair of electrodes. Therefore, this mode is also known as the transverse electric field mode. In the IPS mode, the nematic liquid crystal molecules are uniformly arranged between and parallel to the two substrates, and two polarizers are placed perpendicular to each other. In the IPS mode, the incident light is blocked by the two orthogonal polarizers when no electric field is applied, leading to a dark state. As electric field is applied, the liquid crystal molecules rotate, causing a delay, and as a result, light emerges from the two orthogonal polarizers.

Both positive dielectric anisotropy (Δε) liquid crystal (p-LC) and negative dielectric anisotropy (Δε) liquid crystal (n-LC) can be used in the IPS mode. The driving voltage required for the p-LC at 100% of the transmittance is lower than that of n-LC, since the driving voltage required for 100% of the transmittance decreases with increase of the absolute value of Δε. In addition, the response speed of p-LC is faster than that of n-LC. However, the n-LC gives rise to better transmittance than the p-LC, mainly because of the different alignments of n-LC molecules and p-LC molecules in the liquid crystal cells, and the different rotations of n-LC molecules and p-LC molecules in the presence of a voltage. The p-LC molecules are affected by the vertical electric field of edge of the electrodes, resulting in a decrease in effective Δn*d. Therefore, under the power-on condition, the transmittance of the IPS mode using a p-LC (p-IPS) is lower than that of the IPS mode using n-LC (n-IPS). The n-IPS mode has a slow response speed given the use of n-LC. There is thus an urgent need to improve the transmittance of p-IPS to the greatest extent.

Based on the light leakage test of traditional IPS-LCD, it is found that the followings are the main causes of the light leakage issues of LCD device: LC light scattering, rubbing uniformity, CF/TFT scattering, and polarize ability, wherein LC light scattering accounts for 63%, rubbing uniformity 20%, CF/TFT scattering 14%, and polarize ability 3%.

Given the following formula, in order to improve the light scattering of LC material, it is necessary to increase the average elastic constant $K_{ave}$. With the increase of $K_{ave}$, light leakage of LC materials is able to be suppressed.

$$LC\ Scattering \propto \frac{d \cdot \Delta n^2 \cdot (n_c + n_0)^2}{K_{ave}}$$

In addition, the relationship between contrast (CR) and brightness (L) is as follows:

$CR = L_{255}/L_0 \times 100\%$, in which, $L_{255}$ is the ON-state brightness, and $L_0$ is the OFF-state brightness. It can be seen that CR is significantly influenced by the change of $L_0$. In the OFF state, $L_0$ is related to the LC light scattering, instead of the dielectric properties of the liquid crystal molecules. $L_0$ decreases with the reduction of LC light scattering, thus significantly enhancing CR.

In view of the above, the contrast of the LC material of the p-IPS mode can be improved by increasing the average elastic constant $K_{ave}$ of the liquid crystal composition, as a result, the LC molecules become more organized. As the degree of molecular ordering increases, the light leakage is reduced, and the transmittance is improved.

Further, in order to maintain a sufficiently high transmittance, the absolute value of the dielectric anisotropy of most liquid crystal compositions in the prior art is low, resulting in a high driving voltage in the liquid crystal display device comprising such liquid crystal compositions. As a direct result, the energy-saving and environment-friendly performances of the liquid crystal display device are affected. Accordingly, there is a need to provide a liquid crystal composition which has a high dielectric anisotropy while maintaining a sufficiently high transmittance.

SUMMARY OF THE INVENTION

In view of the defects of existing technologies, one objective of the present invention is to provide a liquid crystal composition having a higher optical anisotropy, a higher clearing point, a higher dielectric anisotropy, a high transmittance and a larger elastic constant. When utilized in IPS liquid crystal display devices, the liquid crystal composition can effectively improve the transmittance of the display devices, thus endowing the display device with good display effect and energy-saving and environment-friendly performances. Another objective of the present invention is to provide a liquid crystal display device comprising the liquid crystal composition of the present invention.

In order to achieve the above objects, the present invention in one aspect provides a liquid crystal composition comprising:

at least one compound of general Formula I

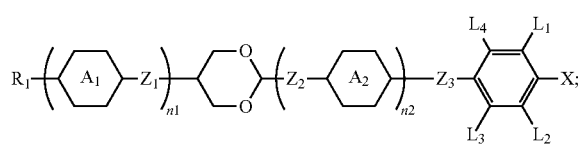

at least one compound of general Formula II

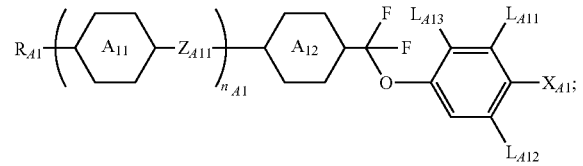

at least one compound of general Formula N

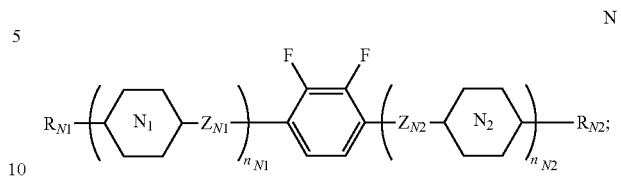

at least one compound of general Formula M

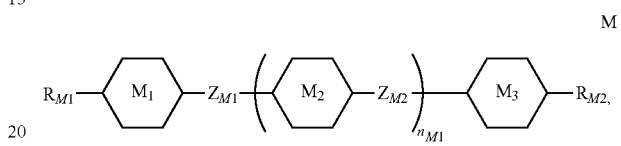

in which, $R_1$ represents $C_{1-12}$ linear or branched alkyl, and one or more nonadjacent —$CH_2$— in the $C_{1-12}$ linear or branched alkyl can each be independently replaced by —C=C—, —C≡C—, —O—, —CO—, —CO—O— or —O—CO—, and one or more —H in the $C_{1-12}$ linear or branched alkyl can each be independently substituted by —F or —Cl;

$R_{A1}$ represents $C_{1-12}$ linear or branched alkyl,

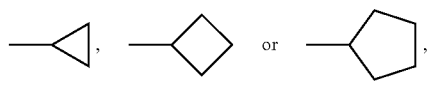

and one or more nonadjacent —$CH_2$— in the $C_{1-12}$ linear or branched alkyl can each be independently replaced by —CH=CH—, —C≡C—, —O—, —CO—, —CO—O— or —O—CO—, and one or more —H in these groups can each be independently substituted by —F or —Cl; $R_{N1}$ and $R_{N2}$ each independently represents $C_{1-12}$ linear or branched alkyl or alkoxy, or $C_{2-12}$ linear or branched alkenyl or alkenoxy, and one or more nonadjacent —$CH_2$— in the $C_{1-1}$ linear or branched alkyl or alkoxy, or the $C_{2-12}$ linear or branched alkenyl or alkenoxy can each be independently replaced by —C≡C—, —O—, —CO—, —CO—O— or —O—CO—;

$R_{M1}$ and $R_{M2}$ each independently represents —H, —F,

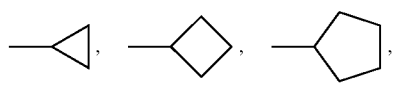

$C_{1-12}$ linear or branched halogenated or unhalogenated alkyl or alkoxy, or $C_{2-12}$ linear or branched halogenated or unhalogenated alkenyl or alkenoxy, and one or more nonadjacent —$CH_2$— in the $C_{1-12}$ linear or branched halogenated or unhalogenated alkyl or alkoxy, or the $C_{2-12}$ linear or branched halogenated or unhalogenated alkenyl or alkenoxy can each be independently replaced by —C≡C—, —O—, —CO—, —CO—O— or —O—CO—;

ring

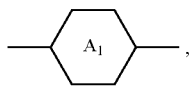, ring

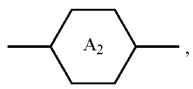, ring

and ring

each independently represents

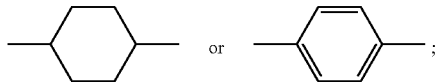;

wherein, one or more —CH₂— in

can be replaced by —O—, and one or more single bonds in the ring can be replaced by double bond; one or more —H on

can be substituted by —CN, —F or —Cl, and one or more —CH= in the ring can be replaced by —N=;

ring

and ring

each independently represents

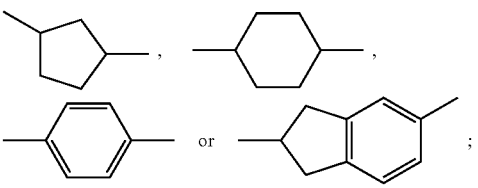;

wherein, one or more —CH₂— in

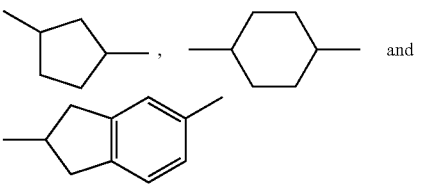

and can be replaced by —O—, and one or more single bonds in the ring can be replaced by double bond; one or more —H on

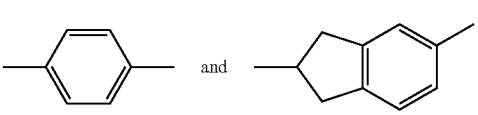

and can be substituted by —CN, —F or —Cl, and one or more —CH= in the ring can be replaced —N=;

ring

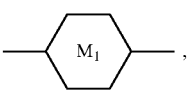, ring

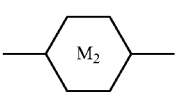

and ring

each independently represents

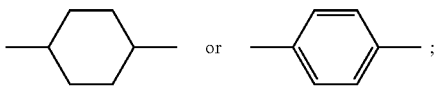

wherein, at most one —CH$_2$— in

can be replaced by —O—, and at most one —H on

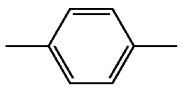

can be substituted by halogen;

$Z_1$, $Z_2$ and $Z_3$ each independently represents sing bond, —CH$_2$CH$_2$—, —CF$_2$CF$_2$—, —CO—O—, —O—CO—, —O—CO—O—, —CH=CH—, —CF=CF—, —CH$_2$O— or —OCH$_2$—;

$Z_{A11}$ represents single bond, —CH$_2$CH$_2$—, —CF$_2$CF$_2$—, —CF$_2$O—, —OCF$_2$—, —CO—O—, —O—CO—, —O—CO—O—, —CH=CH—, —C≡C—, —CF=CF—, —CH$_2$O— or —OCH$_2$—;

$Z_{M1}$ and $Z_{M2}$ each independently represents single bond, —CO—O—, —O—CO—, —CH$_2$O—, —OCH$_2$—, —CH=CH—, —C≡C—, —CH$_2$CH$_2$— or —(CH$_2$)$_4$—;

$Z_{N1}$ and $Z_{N2}$ each independently represents single bond, —CO—O—, —O—CO—, —CH$_2$O—, —OCH$_2$—, —CH=CH—, —C≡C—, —CH$_2$CH$_2$—, —(CH$_2$)$_4$—, —CF$_2$O—, —OCF$_2$— or —CF$_2$CF$_2$—;

$L_1$, $L_2$, $L_3$ and $L_4$ each independently represents —H, —CH$_3$ or halogen;

X represents halogen, $C_{1-5}$ halogenated alkyl or halogenated alkoxy, or $C_{2-5}$ halogenated alkenyl or halogenated alkenoxy;

n1 and n2 each independently represents 0, 1 or 2, and 0≤n1+n2≤3; when n1=2, ring

can be same or different, and $Z_1$ can be same or different; when n2=2, ring

can be same or different, and $Z_2$ can be same or different;

$L_{A11}$, $L_{A12}$ and $L_{A13}$ each independently represents —H, —F, —CH$_3$ or —Cl;

$X_{A1}$ represents halogen, $C_{1-5}$ halogenated alkyl or halogenated alkoxy, or $C_{2-5}$ halogenated alkenyl or halogenated alkenoxy;

$n_{A1}$ represents 0, 1, 2 or 3, and when $n_{A1}$=2 or 3, ring

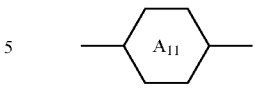

can be same or different, $Z_{A11}$ can be same or different;

$n_{M1}$ represents 0, 1, 2 or 3, and when $n_{M1}$=2 or 3, ring

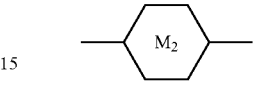

can be same or different, $Z_M2$ can be same or different; and $n_{N1}$ represents 0, 1, 2 or 3, $n_N2$ represents 0 or 1, and 0≤$n_{N1}$+$n_{N2}$≤3; when $n_{N1}$=2 or 3, ring

can be same or different, and $Z_{N1}$ can be same or different.

In some embodiments of the present invention, the compound of general Formula I has a positive dielectric anisotropy, and the compound of general Formula N has a negative dielectric anisotropy.

In some embodiments of the present invention, the compound of general Formula M has a dielectric anisotropy with an absolute value of no more than 3.

In some embodiments of the present invention, the content of the compound of general Formula I needs to be appropriately adjusted based on the required properties, such as solubility at low temperature, transition temperature, electrical reliability, birefringence, process adaptability, drip marks, screen burn-in, dielectric anisotropy and the like.

Preferred weight percentage of the compound of general Formula I in the liquid crystal composition of the present invention. The preferred lower limit of the weight percentage of the compound of general Formula I in the liquid crystal composition of the present invention is 0.1%, 0.5%, 1%, 2%, 3%, 4%, 5%, 7%, 8%, 9%, 10%, 11%, 12%, 13%, 14%, 15%, 20%, 30% or 40%, relative to the total weight of the liquid crystal composition of the present invention; and the preferred upper limit of the weight percentage of the compound of general Formula I in the liquid crystal composition of the present invention is 60%, 55%, 50%, 45%, 40%, 35%, 30%, 28%, 27%, 26%, 25.5%, 25%, 24.5%, 24%, 22% or 20%, relative to the total weight of the liquid crystal composition of the present invention.

In some embodiments of the present invention, the compound of general Formula I provides 0.1%-60% by weight of the total weight of the liquid crystal composition.

In some embodiments of the present invention, in the compound of general Formula I, $R_1$ is preferably $C_{1-8}$ linear or branched alkyl or alkoxy, or $C_{2-8}$ linear or branched alkenyl or alkenoxy, further preferably $C_{1-5}$ linear or branched alkyl or alkoxy, or $C_{2-5}$ linear or branched alkenyl or alkenoxy; ring

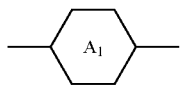

and ring

each independently represents

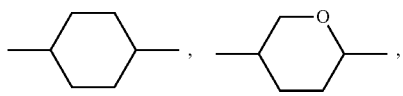,

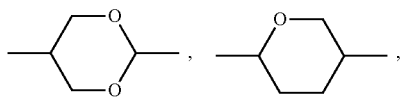,

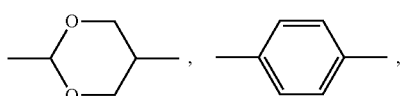 or

.

In some embodiments of the present invention, the compound of general Formula I is selected from a group consisting of the following compounds:

I-1

I-2

I-3

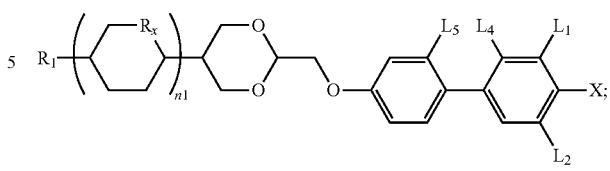

I-4

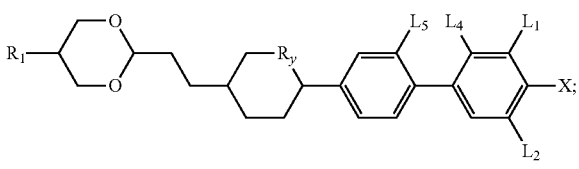

I-5

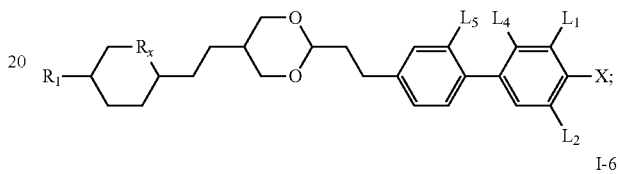

I-6

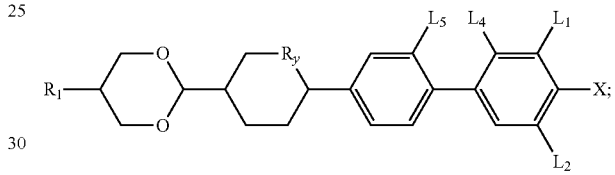

I-7

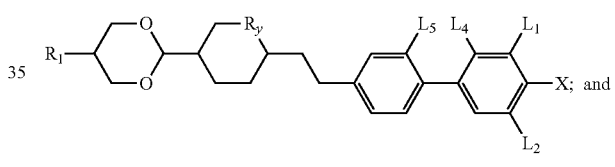

I-8

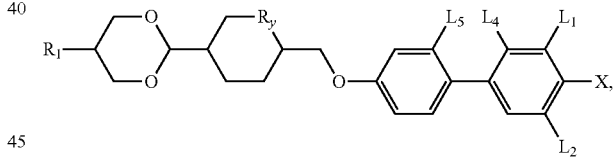

in which, $L_5$ represents —H or —F;

$R_x$ and $R_y$ each independently represents —CH$_2$— or —O—; and n1 represents 0 or 1.

In some embodiments of the present invention, the liquid crystal composition of the present invention preferably comprises at least one compound of general Formula I; more preferably at least one compound of general Formula I-1 to general Formula I-8; further preferably 2 to 10 compounds of general Formula I-1 to general Formula I-8.

In some embodiments of the present invention, the liquid crystal composition of the present invention preferably comprises at least one compound of general Formula I; more preferably at least two compounds of general Formula I-1 to general Formula I-8.

In some embodiments of the present invention, the compound of general Formula I is preferably selected from a group consisting of the following compounds:

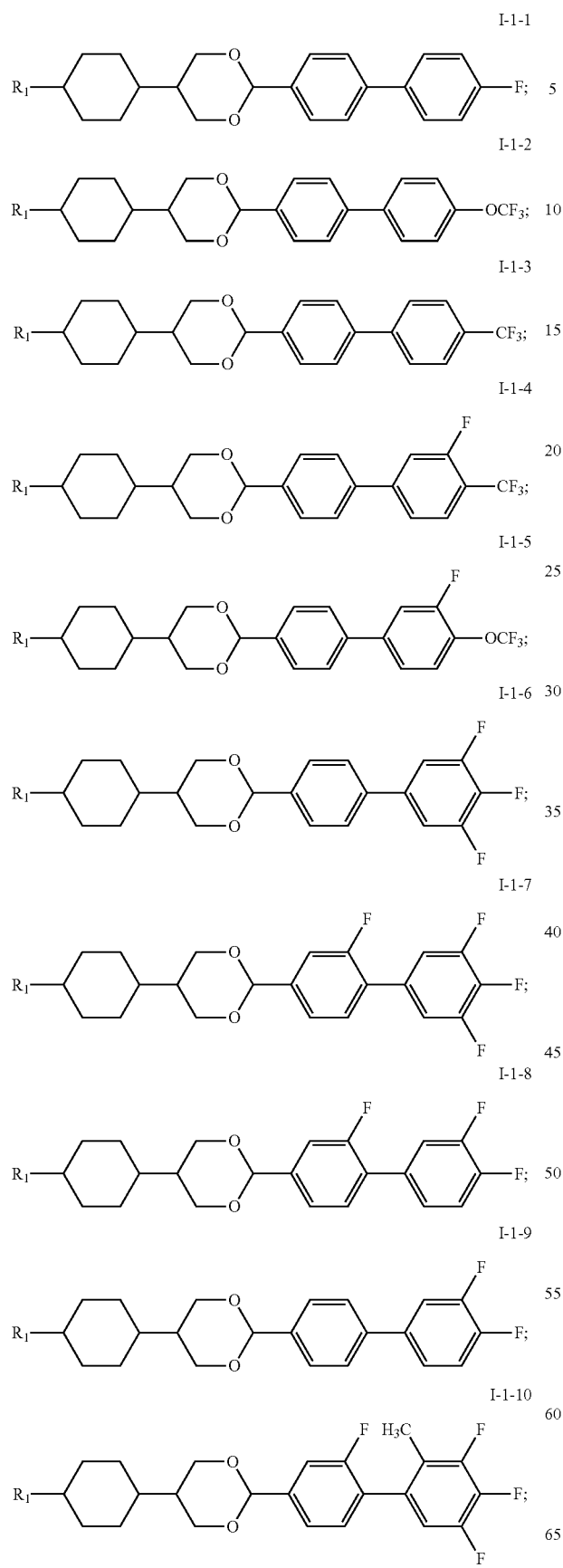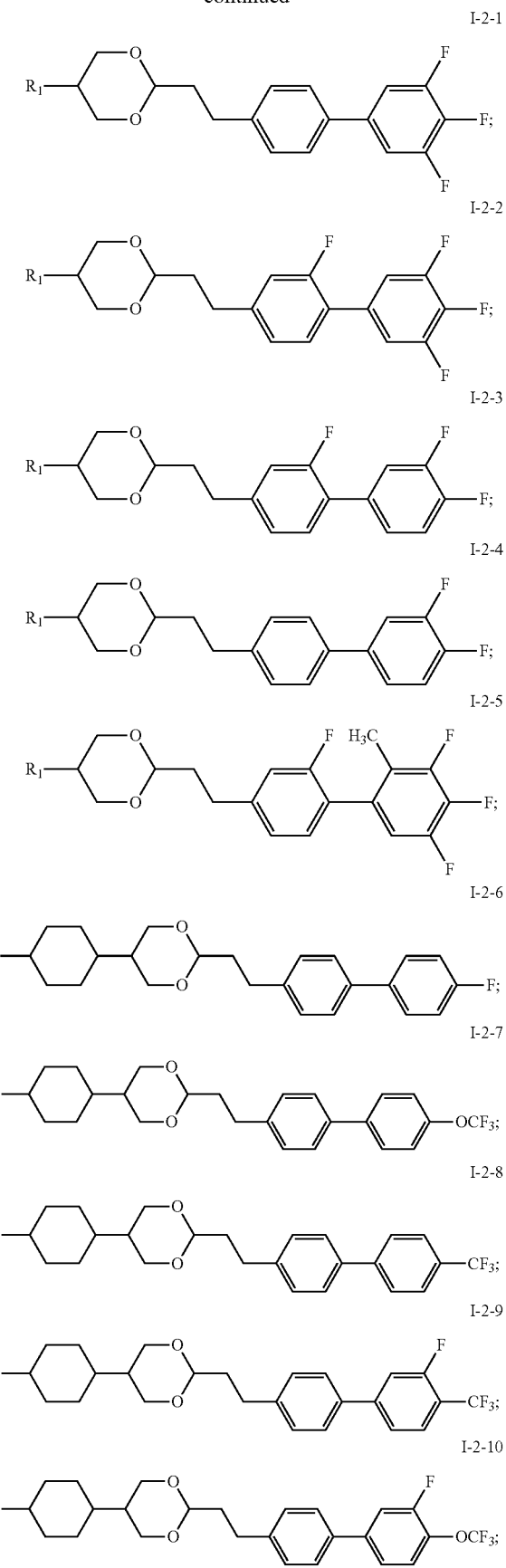

I-2-11
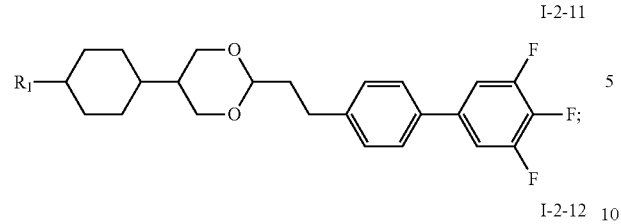
I-2-12
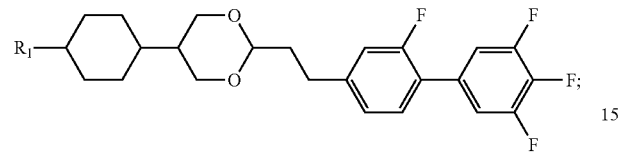
I-2-13
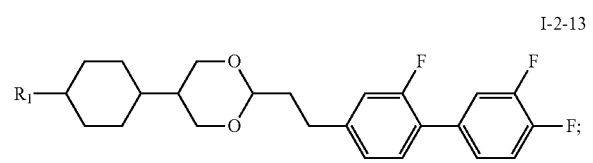
I-2-14
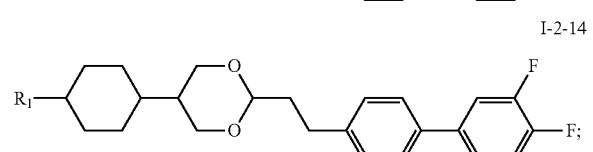
I-2-15
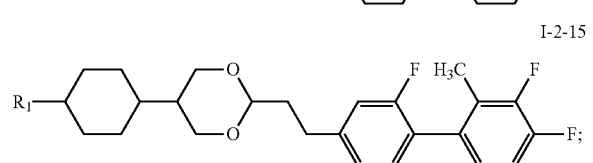
I-3-1
I-3-2
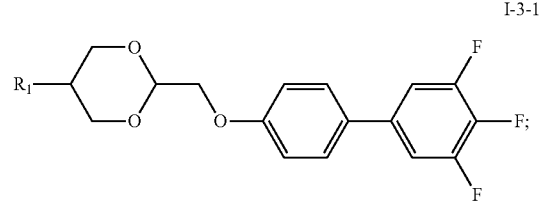
I-3-3
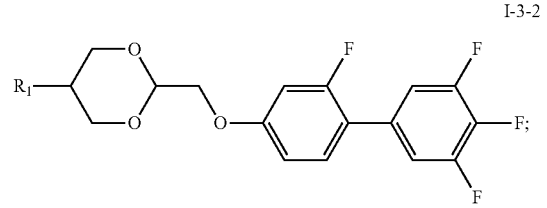
I-3-4
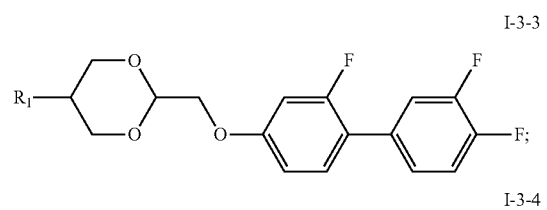
I-3-5
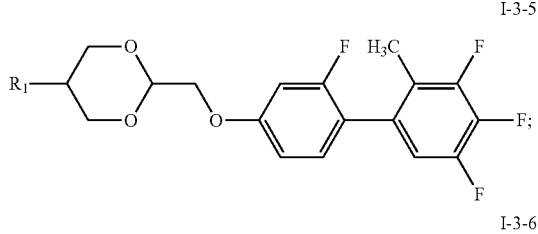
I-3-6
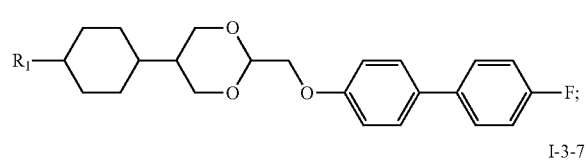
I-3-7
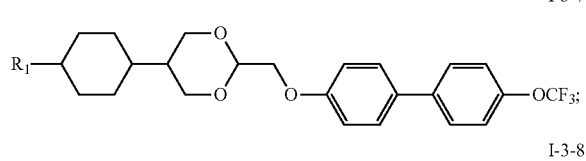
I-3-8
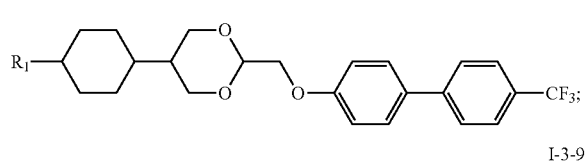
I-3-9
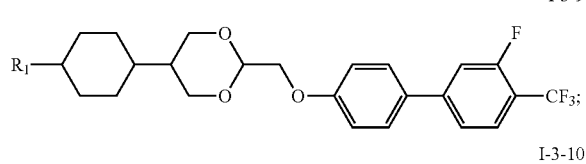
I-3-10
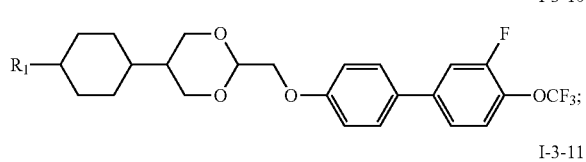
I-3-11
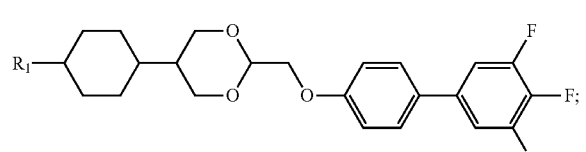
I-3-12
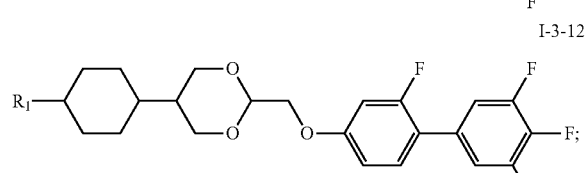
I-3-13
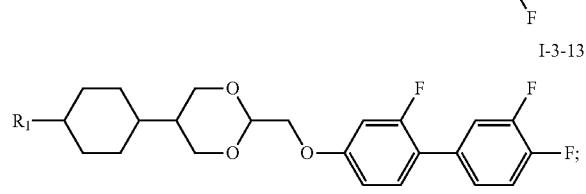
I-3-14
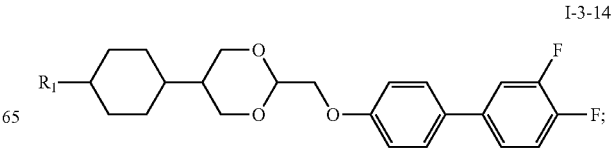

I-3-15
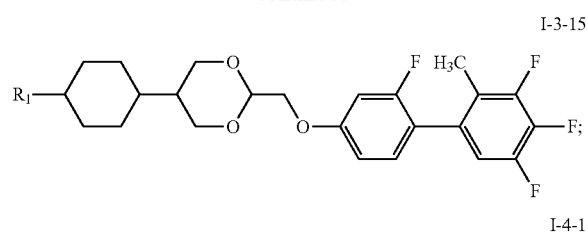
I-4-1
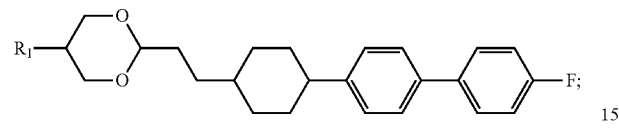
I-4-2
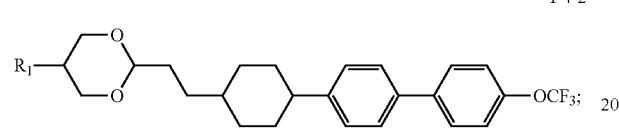
I-4-3
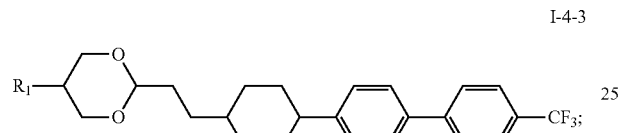
I-4-4
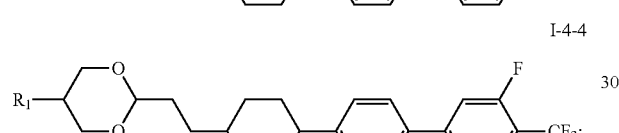
I-4-5
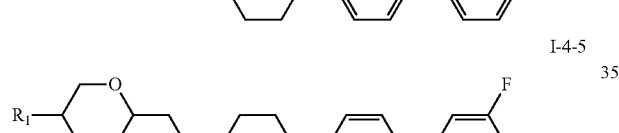
I-4-6
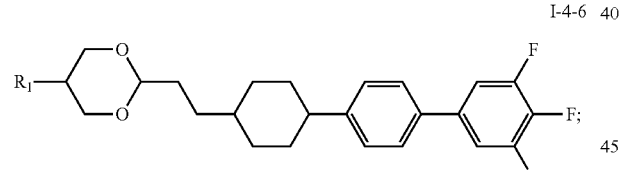
I-4-7
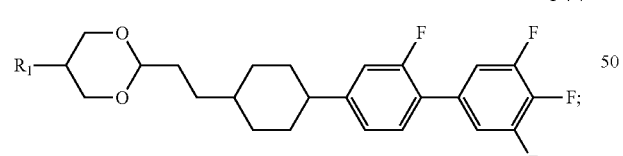
I-4-8
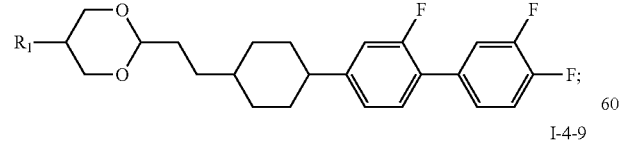
I-4-9
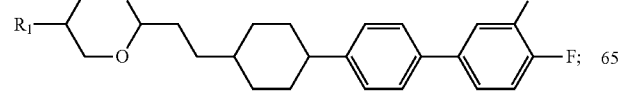
I-4-10
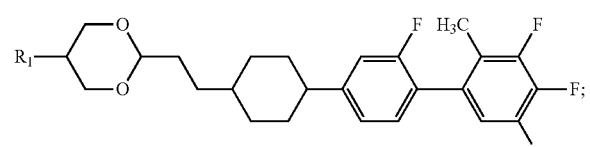
I-5-1
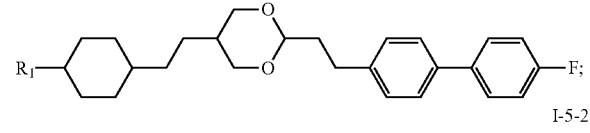
I-5-2
I-5-3
I-5-4
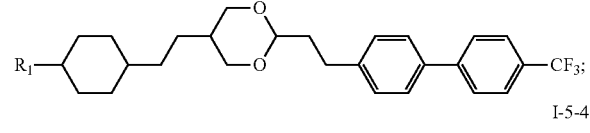
I-5-5
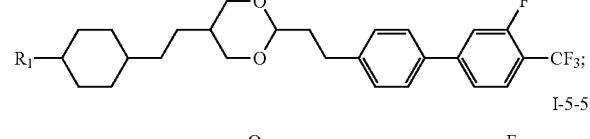
I-5-6
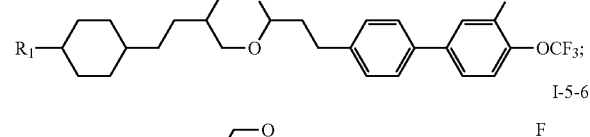
I-5-7
I-5-8
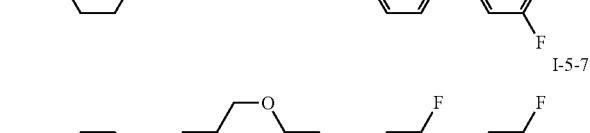
I-5-9
I-5-10

I-6-1 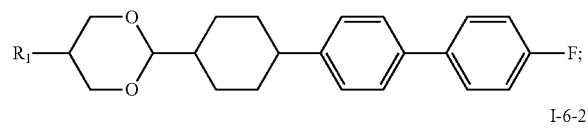
I-6-2 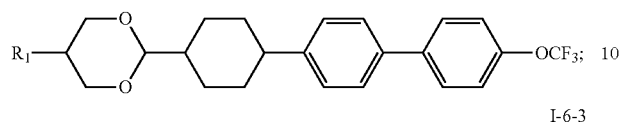
I-6-3 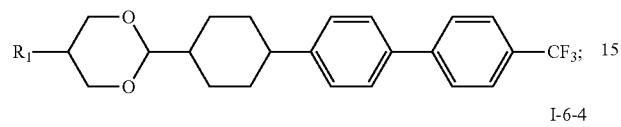
I-6-4 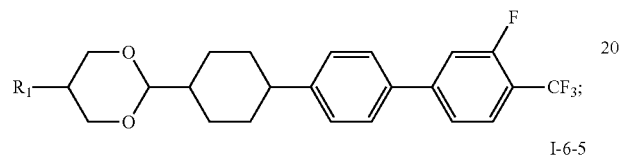
I-6-5 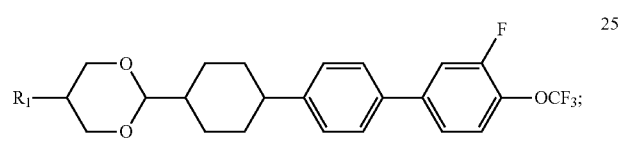
I-6-6 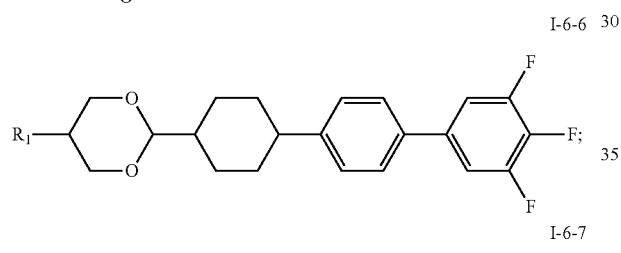
I-6-7 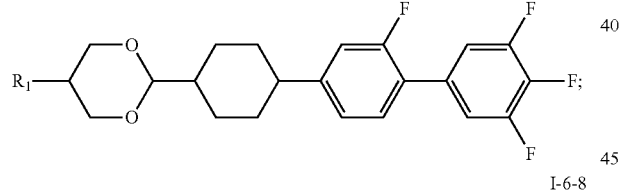
I-6-8 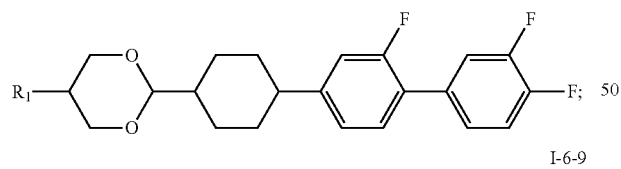
I-6-9 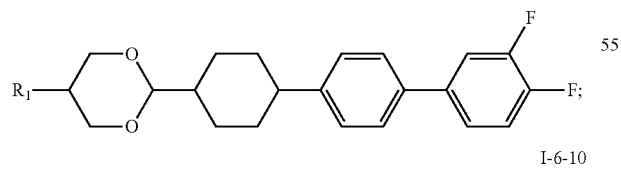
I-6-10 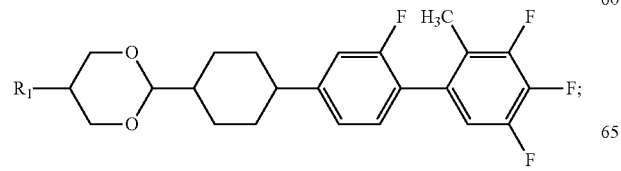
I-7-1 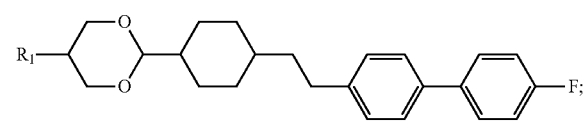
I-7-2 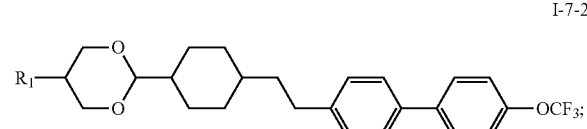
I-7-3 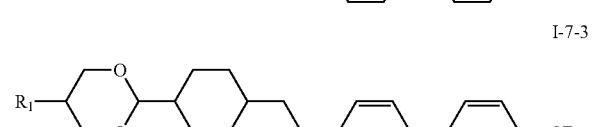
I-7-4 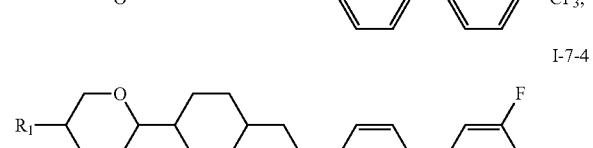
I-7-5 
I-7-6 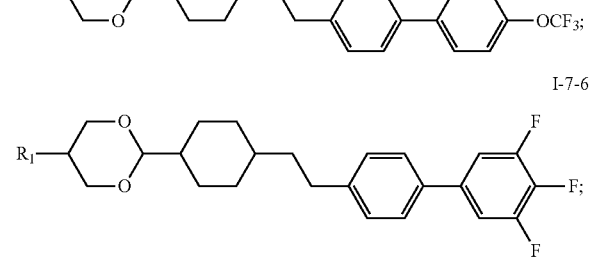
I-7-7 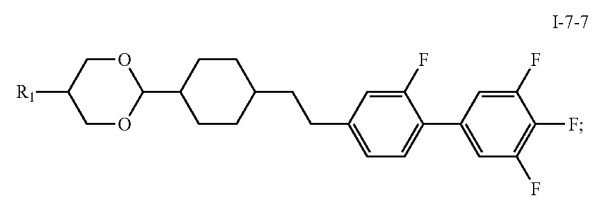
I-7-8 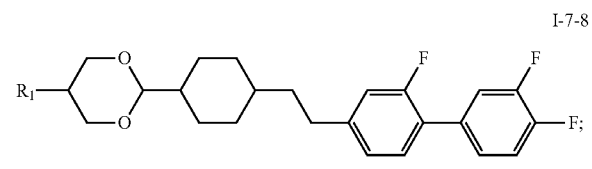
I-7-9 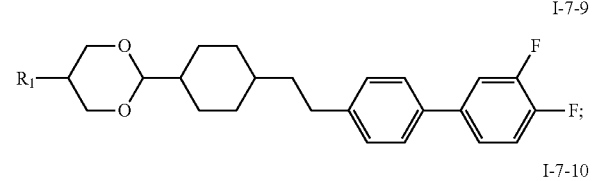
I-7-10 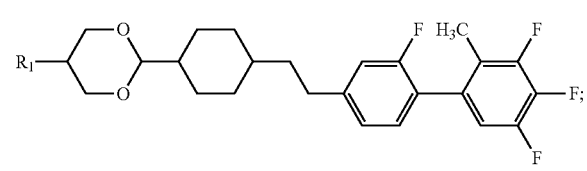

-continued

I-8-1
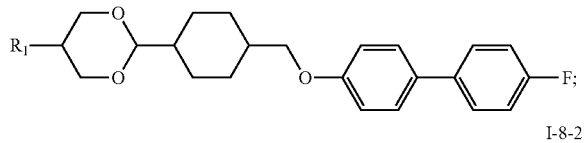

I-8-2
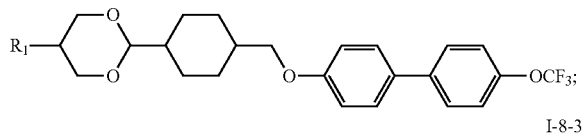

I-8-3
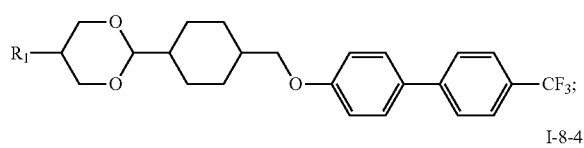

I-8-4
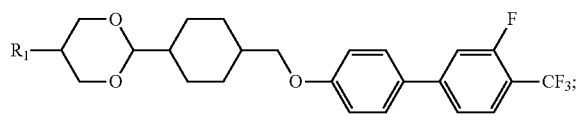

I-8-5
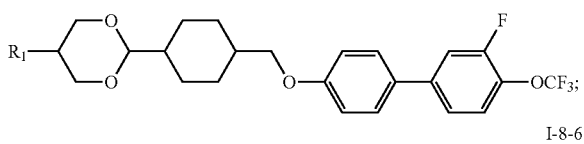

I-8-6
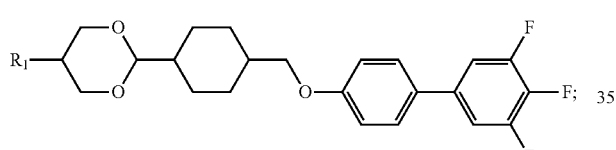

I-8-7
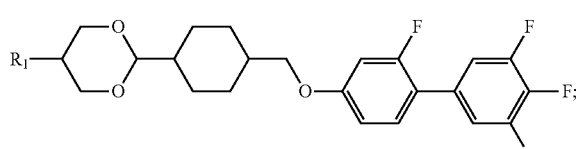

I-8-8
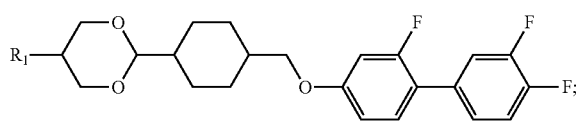

I-8-9
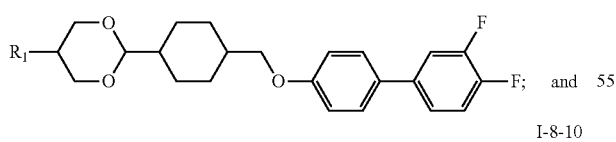

and

I-8-10
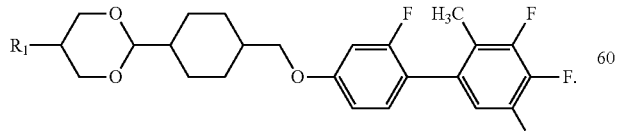

In some embodiments of the present invention, the compound of general Formula I is preferably selected from a group consisting of the compounds of general Formula I-1-6, general Formula I-2-1, general Formula I-2-11 and general Formula I-8-9.

In some embodiments of the present invention, $R_{A1}$ in the compound of general Formula II is preferably $C_{1-8}$ linear or branched alkyl or alkoxy, or $C_{2-8}$ linear or branched alkenyl or alkenoxy; further preferably $C_{1-5}$ linear or branched alkyl or alkoxy, or $C_{2-5}$ linear or branched alkenyl or alkenoxy.

In some embodiments of the present invention, ring

and ring

each independently represents

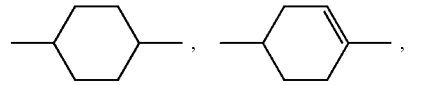

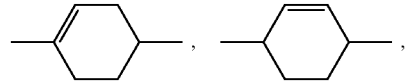

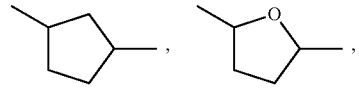

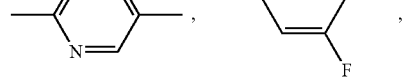

21
-continued
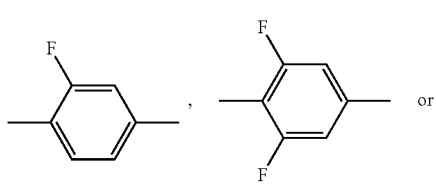
22
-continued
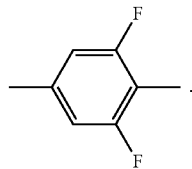
In some embodiments of the present invention, the compound of general Formula II is selected from a group consisting of the following compounds:
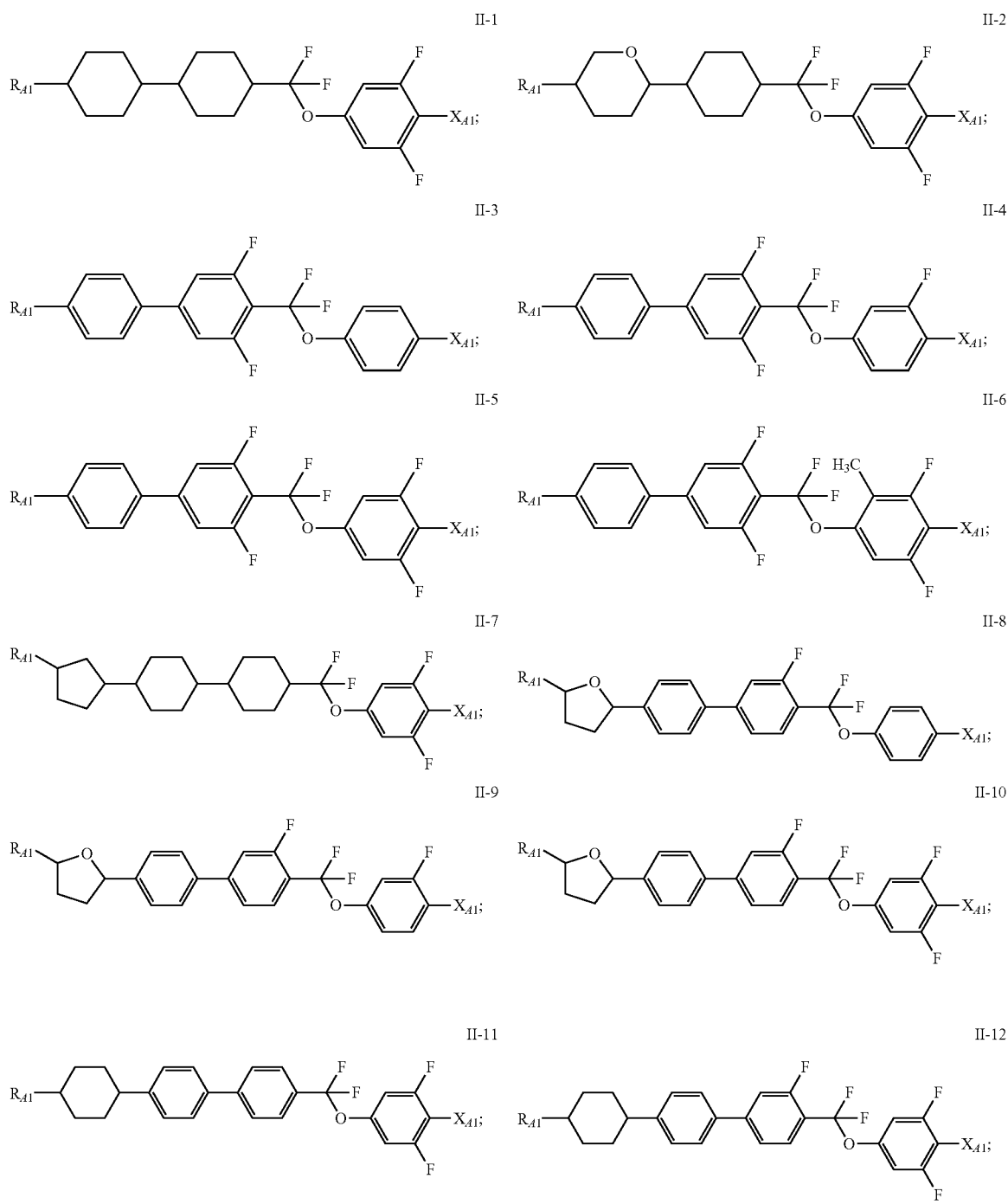

-continued
II-13
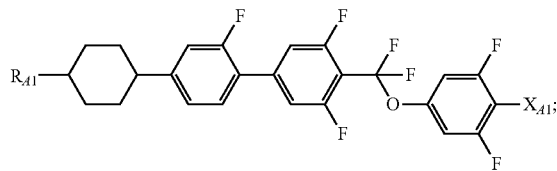
II-14
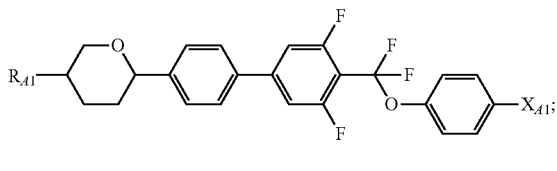
II-15
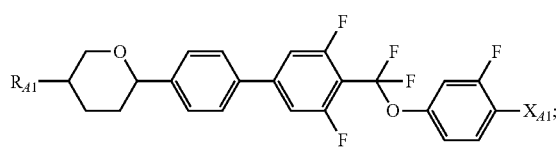
II-16
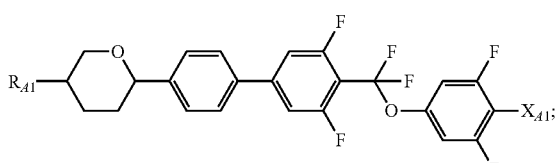
II-17
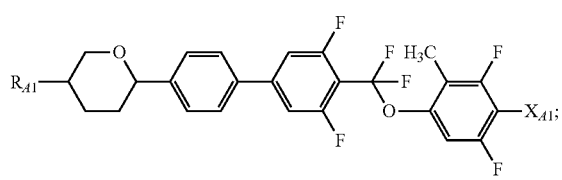
II-18
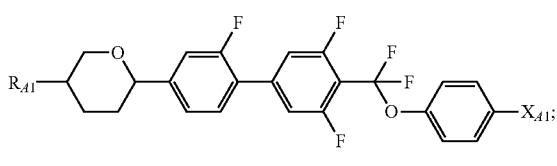
II-19
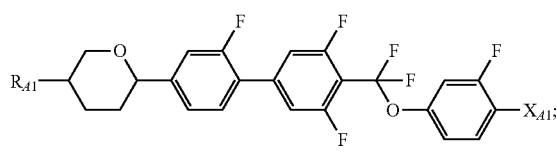
II-20
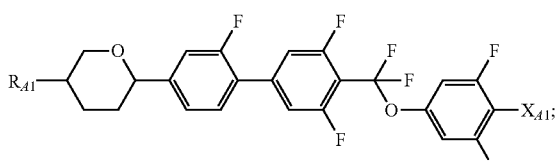
II-21
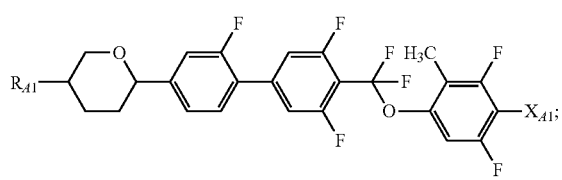
II-22
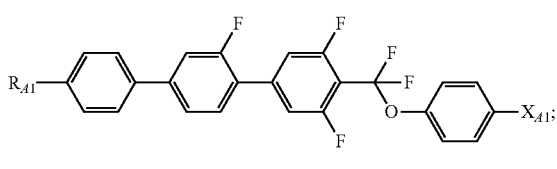
II-23
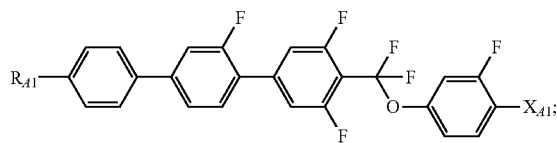
II-24
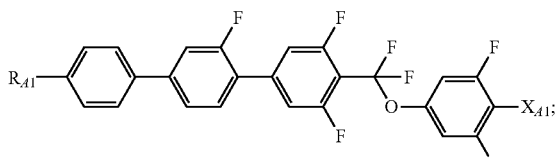
II-25
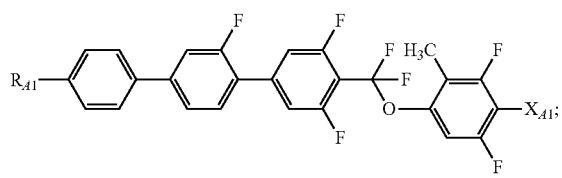
II-26
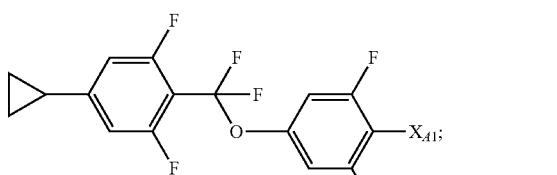

-continued
II-27
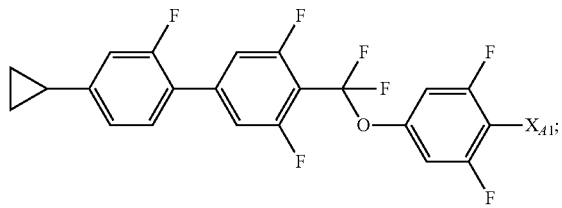
II-28
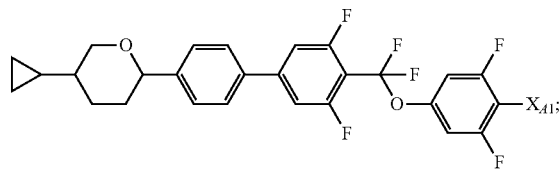
II-29
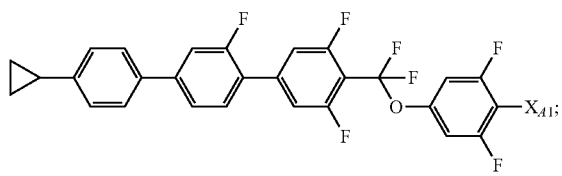
II-30
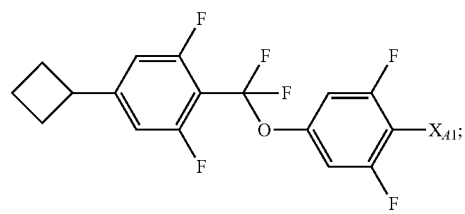
II-31
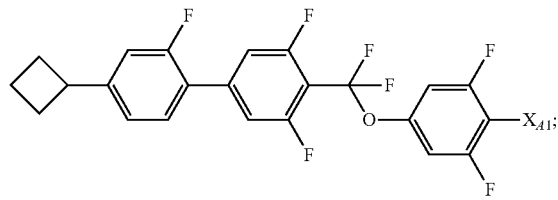
II-32
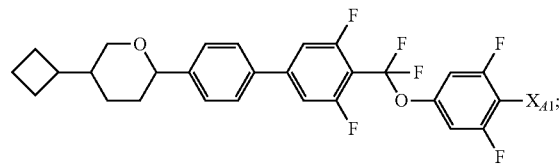
II-33
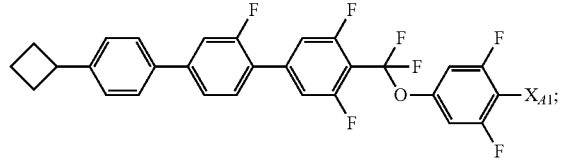
II-34
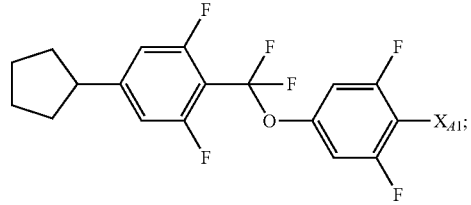
II-35
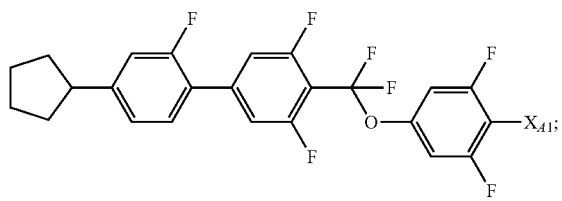
II-36
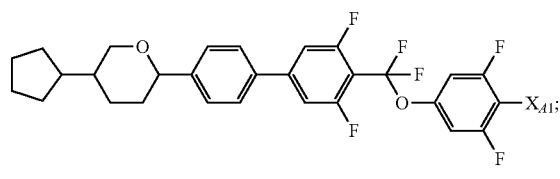
II-37
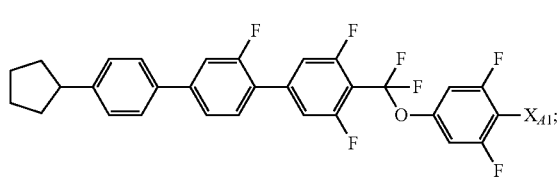
II-38
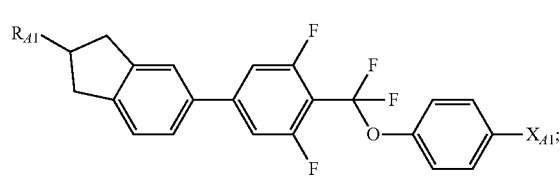
II-39
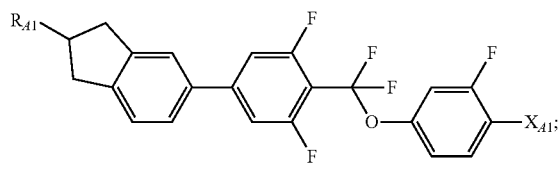
II-40
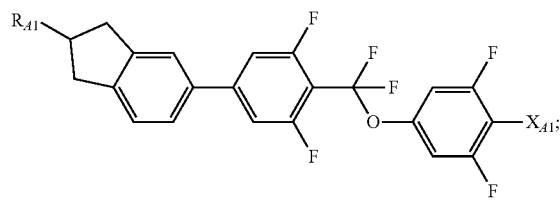

II-41
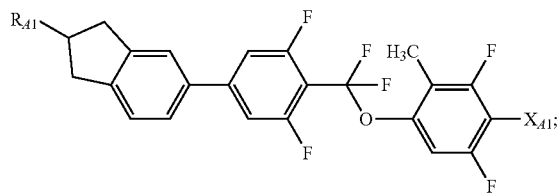
II-42
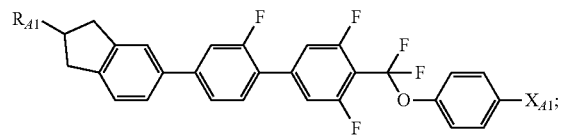
II-43
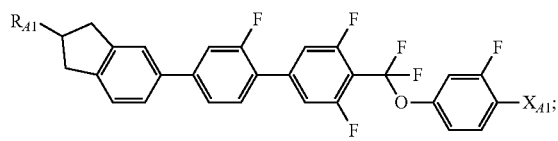
II-44
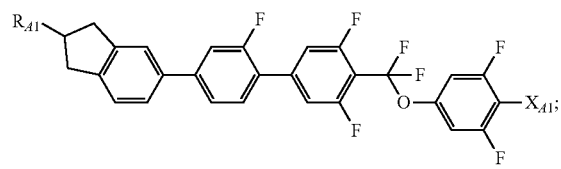
II-45
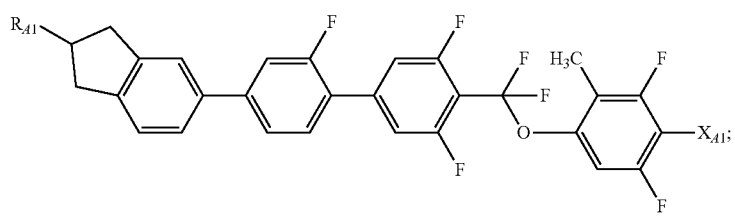
II-46
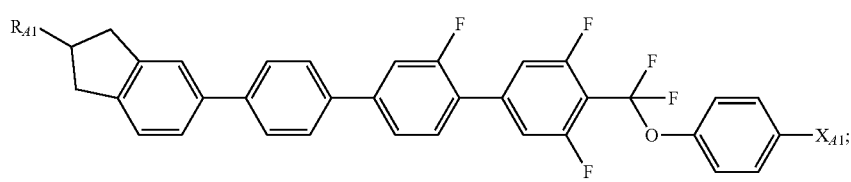
II-47
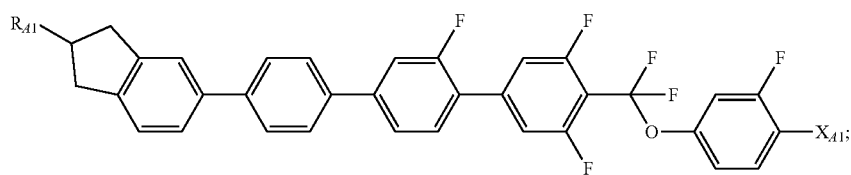
II-48
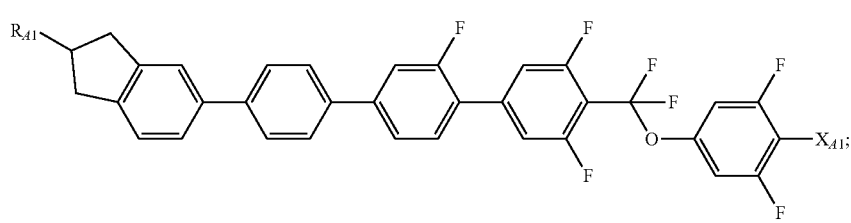
II-49
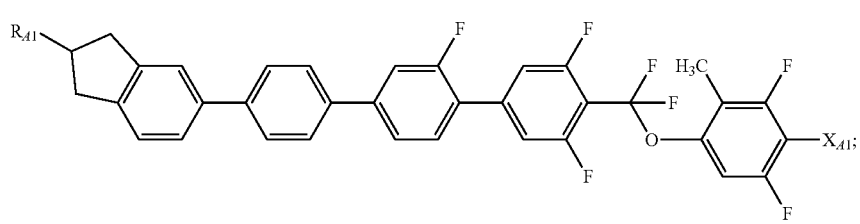

-continued
II-50
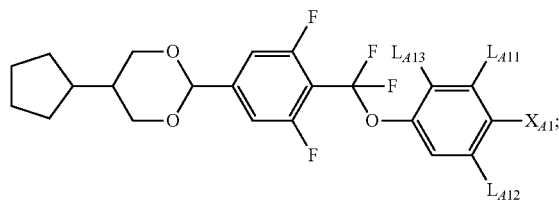
II-51
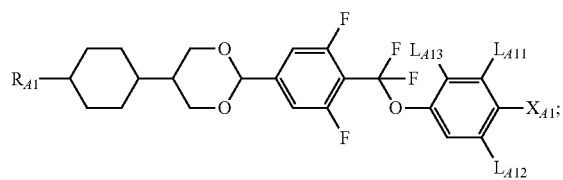
II-52
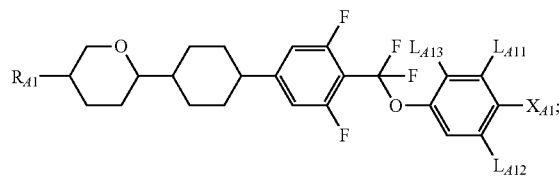
II-53
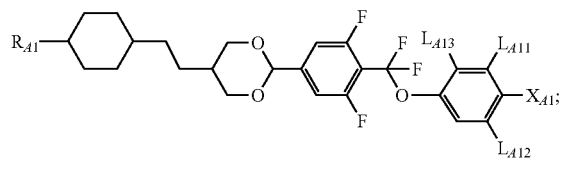
II-54
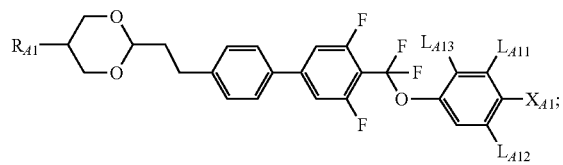
II-55
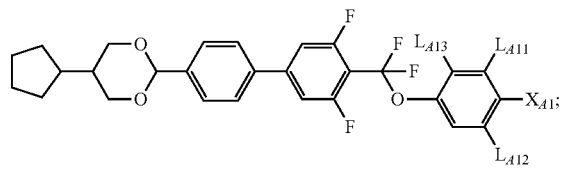
II-56
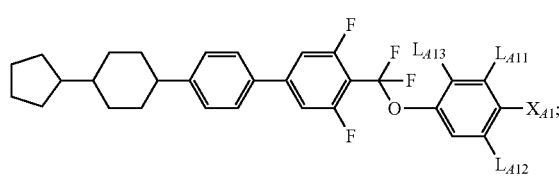
II-57
II-58
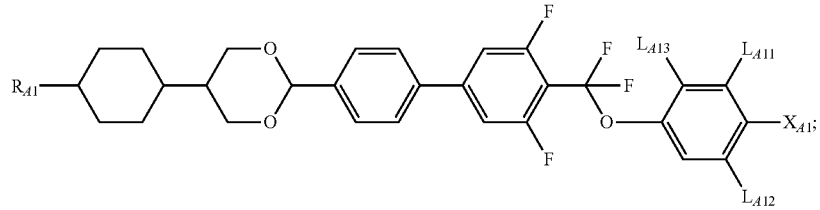
II-59
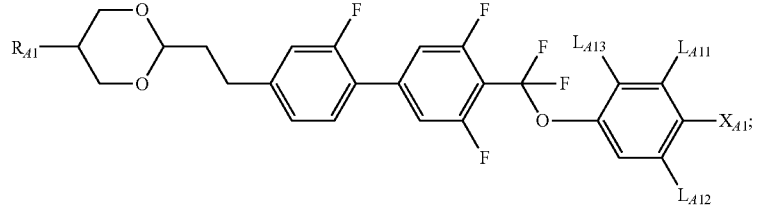
II-60
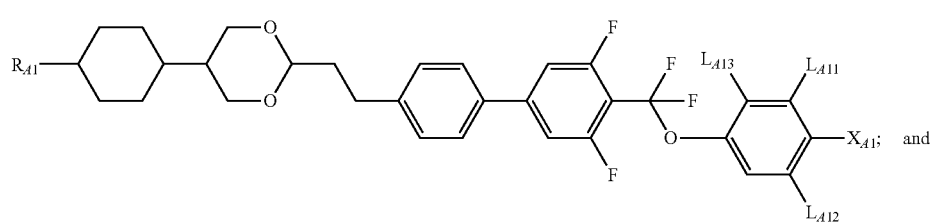

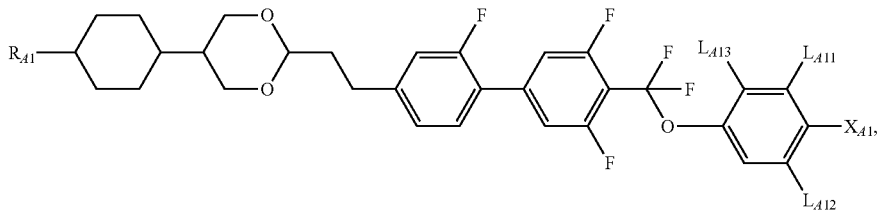

II-61 in which, $R_{A1}$ represents $C_{1-12}$ linear or branched alkyl, and one or more nonadjacent —$CH_2$— in the $C_{1-12}$ linear or branched alkyl can each be independently replaced by —CH=CH—, —C≡C—, —O—, —CO—, —CO—O— or —O—CO—.

Preferred weight percentage of the compound of general Formula II in the liquid crystal composition of the present invention. The preferred lower limit of the weight percentage of the compound of general Formula II in the liquid crystal composition of the present invention is 1%, 3%, 5%, 7%, 9%, 10%, 12%, 15%, 18%, 20%, 30% or 40%, relative to the total weight of the liquid crystal composition of the present invention; and the preferred upper limit of the weight percentage of the compound of general Formula II in the liquid crystal composition of the present invention is 75%, 70%, 65%, 60%, 55%, 50%, 45%, 35% or 25%, relative to the total weight of the liquid crystal composition of the present invention.

In some embodiments of the present invention, the compound of general Formula II provides 1%-75% by weight of the total weight of the liquid crystal composition.

In some embodiments of the present invention, the compound of general Formula II preferably has a dielectric anisotropy with an absolute value of more than 4.

In some embodiments of the present invention, the compound of general Formula II is preferably selected from a group consisting of the compounds of general Formula II-16, general Formula II-22 and general Formula II-51.

In some embodiments of the present invention, the compound of general Formula II is preferably selected from a group consisting of at least one compound of general Formula II-1, general Formula II-3, general Formula II-5, general Formula II-6, general Formulas II-8 to II-10, general Formulas II-12 to II-20, general Formulas II-22 to II-25, general Formula II-27, general Formula II-30, general Formula II-31, general Formula II-33, general Formula II-35, general Formula II-40, general Formula II-42, general Formula II-44, and general Formulas II-50 to II-61; the compound of general Formula II is more preferably selected from a group consisting of at least two compounds of general Formula II-1, general Formula II-3, general Formula II-5, general Formula II-6, general Formulas II-8 to II-10, general Formulas II-12 to II-20, general Formulas II-22 to II-25, general Formula II-27, general Formula II-30, general Formula II-31, general Formula II-33, general Formula II-35, general Formula II-40, general Formula II-42, general Formula II-44, and general Formulas II-50 to II-61; the compound of general Formula II is still further preferably selected from a group consisting of at least three compounds of general Formula II-1, general Formula II-3, general Formula II-5, general Formula II-6, general Formula II-8 to II-10, general Formulas II-12 to II-20, general Formulas II-22 to II-25, general Formula II-27, general Formula II-30, general Formula II-31, general Formula II-33, general Formula II-35, general Formula II-40, general Formula II-42, general Formula II-44, and general Formulas II-50 to II-61.

In some embodiments of the present invention, the lower limit and the upper limit of the weight percentage of the compound of general Formula II are preferably slightly lower when it is desired to maintain the liquid crystal composition of the present invention with a lower viscosity and a shorter response time, wherein the lower limit is preferably 3%, 5%, 10%, 13%, 14%, 15%, 18%, 20%, 23%, 25%, 28%, 30%, 33%, 35%, 38% or 40%, and the upper limit is preferably 50%, 48%, 46%, 43%, 40%, 38%, 35%, 33%, 30%, 28%, 25%, 23% or 20%. Further, the lower limit and the upper limit of the weight percentage of the compound of general Formula II are preferably slightly lower when it is desired to maintain the liquid crystal composition of the present invention with a higher clearing point and a good temperature stability, wherein the lower limit is preferably 5%, 10%, 13%, 14%, 15%, 18%, 20%, 23%, 25%, 28% or 30%, and the upper limit is preferably 50%, 45%, 40%, 38%, 35%, 33%, 30%, 28% or 25%. In addition, the lower limit and the upper limit of the weight percentage of the compound of general Formula II are preferably increased in order to maintain the driving voltage lower and make the dielectric anisotropy larger, wherein the lower limit is preferably 10%, 13%, 14%, 15%, 18%, 20%, 23%, 25%, 28% or 30%, and the upper limit is preferably 70%, 68%, 65%, 63%, 60%, 55%, 50%, 40%, 38%, 35%, 33%, 30%, 28% or 25%.

In some embodiments of the present invention, in the compound of general Formula N, preferably, $R_{N1}$ and $R_{N2}$ each independently represents $C_{1-8}$ linear or branched alkyl or alkoxy, or $C_{2-8}$ linear or branched alkenyl or alkenoxy; more preferably, $R_{N1}$ and $R_{N2}$ each independently represents $C_{1-5}$ linear or branched alkyl or alkoxy, or $C_{2-5}$ linear or branched alkenyl or alkenoxy; $R_{N1}$ is further preferably $C_{1-5}$ linear or branched alkyl, or $C_{2-5}$ linear or branched alkenyl, still further preferably, $C_{2-5}$ linear or branched alkyl, or $C_{2-3}$ linear or branched alkenyl; $R_{N2}$ is further preferably $C_{1-4}$ linear or branched alkoxy; and ring

and ring

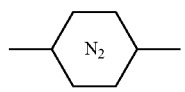

each independently represents
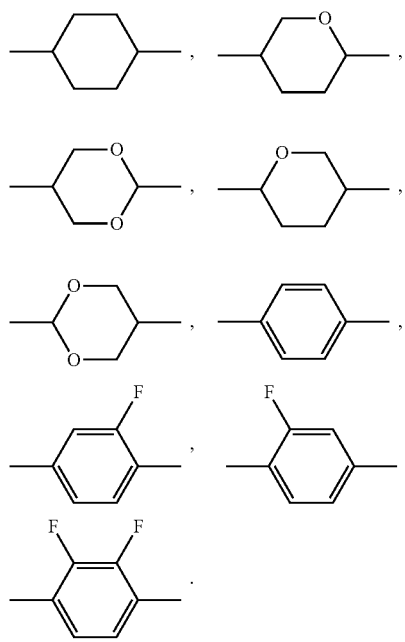
In some embodiments of the present invention, the compound of general Formula N is selected from a group consisting of the following compounds:
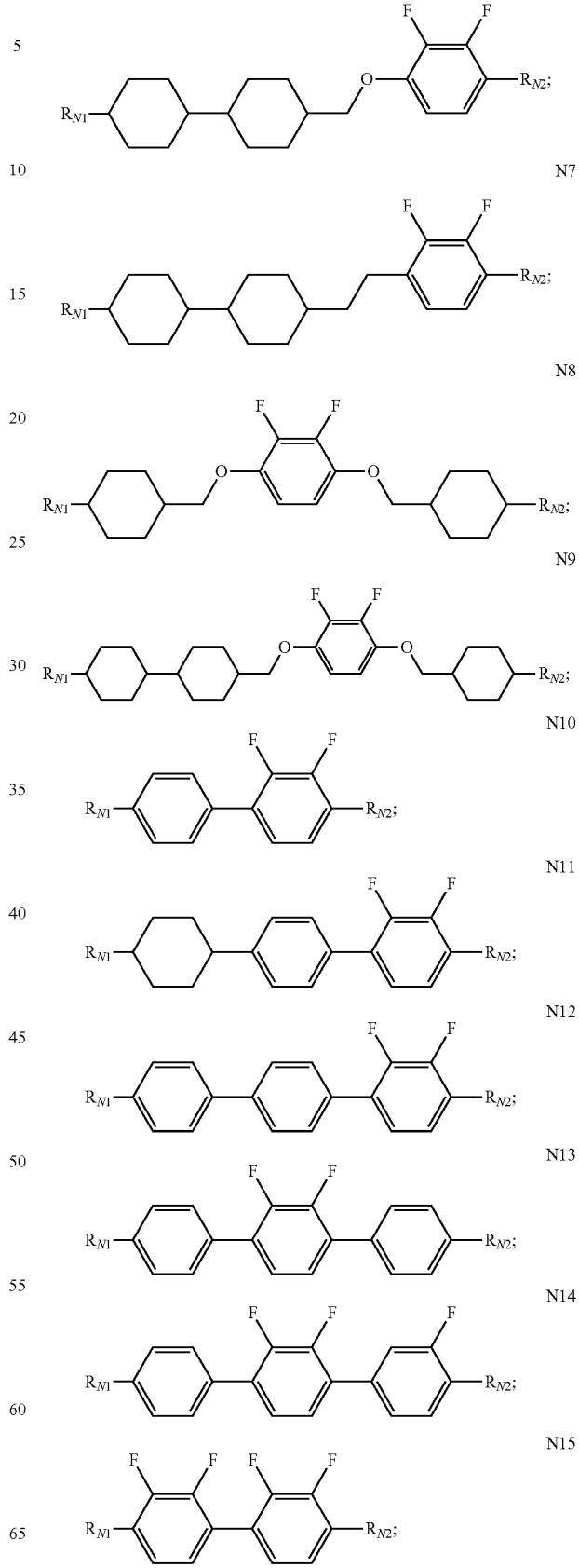

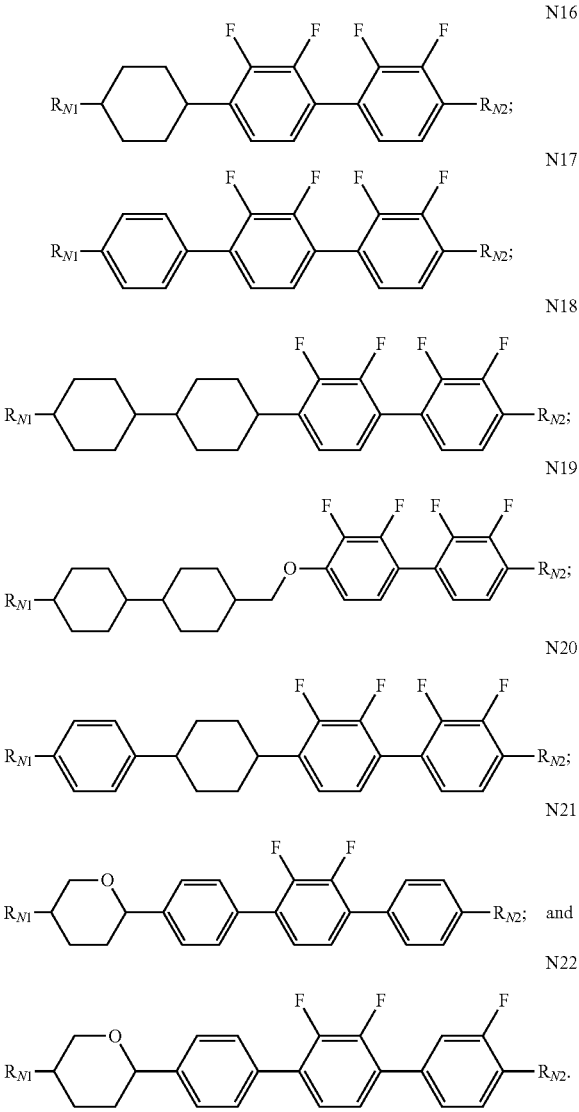

In some embodiments of the present invention, the liquid crystal composition of the present invention preferably comprises at least one compound of general Formula N; more preferably at least one compound of general Formula N2 to general Formula N7, and general Formula N10 to general Formula N19; and further preferably 2 to 10 compounds of general Formula N2 to general Formula N7, and general Formula N10 to general Formula N19.

In some embodiments of the present invention, the compound of general Formula N is preferably selected from a group consisting of the compounds of general Formula N5, general Formula N6, general Formula N1, general Formula N12 and general Formula N18.

Preferred weight percentage of the compound of general Formula N in the liquid crystal composition of the present invention. The preferred lower limit of the weight percentage of the compound of general Formula N in the liquid crystal composition of the present invention is 0.1%, 0.5%, 1%, 3%, 5%, 10%, 13%, 14%, 15%, 18%, 20%, 23%, 25%, 28%, 30%, 33%, 35%, 38% or 40%, relative to the total weight of the composition of the present invention; and the preferred upper limit of the weight percentage of the compound of general Formula N in the liquid crystal composition of the present invention is 50%, 40%, 38%, 35%, 33%, 30%, 28%, 25%, 23%, 20%, 18%, 15% or 10%, relative to the total weight of the composition of the present invention.

In some embodiments of the present invention, the compound of general Formula N provides 0.1%-50% by weight of the total weight of the liquid crystal composition.

In some embodiments of the present invention, the lower limit and the upper limit of the content of the compound of general Formula N are preferably lower when it is desired to maintain the liquid crystal composition of the present invention with a lower viscosity and a shorter response time. Further, the lower limit and the upper limit of the content of the compound of general Formula N are preferably lower when it is desired to maintain the liquid crystal composition of the present invention with a higher clearing point and a good temperature stability. In addition, the lower limit and the upper limit of the content of the compound of general Formula N are preferably increased in order to maintain the driving voltage lower and make the dielectric anisotropy larger.

In some embodiments of the present invention, the compound of general Formula M can effectively improve clearing point, response time, contrast and low temperature stability of the liquid crystal composition.

In some embodiments of the present invention, preferably, $R_{M1}$ and $R_{M2}$ in the compound of general Formula M each independently represents —F, $C_{1-10}$ linear or branched halogenated or unhalogenated alkyl, $C_{1-9}$ linear or branched halogenated or unhalogenated alkoxy, $C_{2-10}$ linear or branched halogenated or unhalogenated alkenyl, or $C_{2-10}$ linear or branched halogenated or unhalogenated alkenoxy; further preferably $C_{1-8}$ linear or branched halogenated or unhalogenated alkyl, $C_{1-7}$ linear or branched halogenated or unhalogenated alkoxy, or $C_{2-8}$ linear or branched halogenated or unhalogenated alkenyl; still further preferably $C_{1-5}$ linear or branched halogenated or unhalogenated alkyl, $C_{1-5}$ linear or branched halogenated or unhalogenated alkoxy, or $C_{2-5}$ linear or branched halogenated or unhalogenated alkenyl.

In some embodiments of the present invention, preferably, one or both of $R_{M1}$ and $R_{M2}$ are $C_{2-8}$ linear or branched halogenated or unhalogenated alkenyl; further preferably, one or both of $R_{M1}$ and $R_{M2}$ are $C_{2-5}$ linear or branched halogenated or unhalogenated alkenyl.

In some embodiments of the present invention, preferably, one of $R_{M1}$ and $R_{M2}$ is $C_{2-5}$ linear or branched halogenated or unhalogenated alkenyl, while the other is $C_{1-5}$ linear or branched halogenated or unhalogenated alkyl.

In some embodiments of the present invention, both of $R_{M1}$ and $R_{M2}$ are preferably $C_{1-8}$ linear or branched halogenated or unhalogenated alkyl, or $C_{1-7}$ linear or branched halogenated or unhalogenated alkoxy; further preferably, $C_{1-5}$ linear or branched halogenated or unhalogenated alkyl, or $C_{1-4}$ linear or branched halogenated or unhalogenated alkoxy.

In some embodiments of the present invention, preferably, one of $R_{M1}$ and $R_{M2}$ is $C_{1-5}$ linear or branched halogenated or unhalogenated alkyl, while the other is $C_{1-5}$ linear or branched halogenated or unhalogenated alkyl, or $C_{1-4}$ linear or branched halogenated or unhalogenated alkoxy; further preferably, both of $R_{M1}$ and $R_{M2}$ are $C_{1-5}$ linear or branched halogenated or unhalogenated alkyl.

The alkenyl group in the present invention is preferably selected from the groups represented by any one of formula (V1) to formula (V9), particularly formula (V1), formula (V2), formula (V8) or formula (V9). The groups represented by formula (V1) to formula (V9) are as follows:

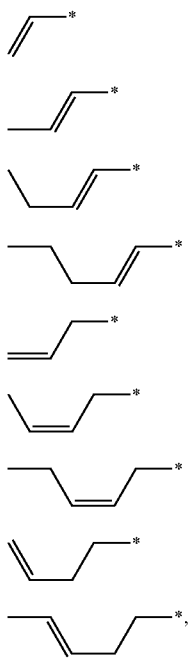

(V1)
(V2)
(V3)
(V4)
(V5)
(V6)
(V7)
(V8)
(V9)

in which, * represents bound carbon atom in the ring structure.

The alkenoxy group in the present invention is preferably selected from the groups represented by any one of formula (OV1) to formula (OV9), particularly formula (OV1), formula (OV2), formula (OV8) or formula (OV9). The groups represented by formula (OV1) to formula (OV9) are as follows:

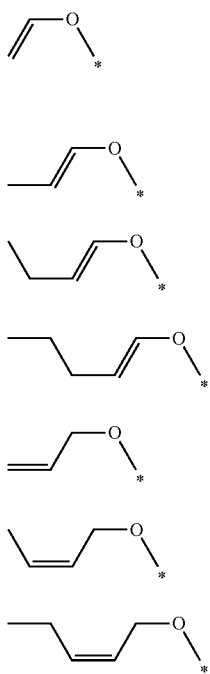

(OV1)
(OV2)
(OV3)
(OV4)
(OV5)
(OV6)
(OV7)
(OV8)
(OV9)

in which, * represents bound carbon atom in the ring structure.

In some embodiments of the present invention, the compound of general Formula M is selected from a group consisting of the following compounds:

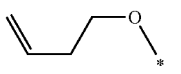

M1

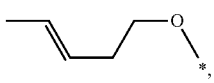

M2

M3

M4

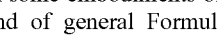

M5

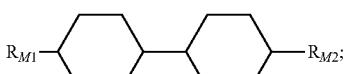

M6

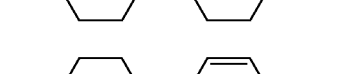

M7

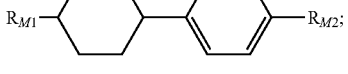

M8

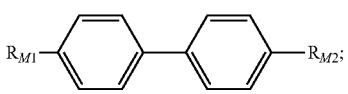

M9

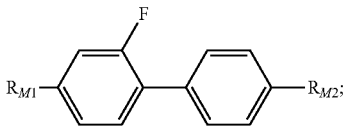

M10

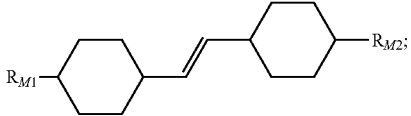

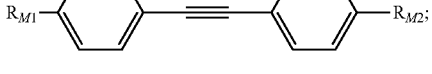

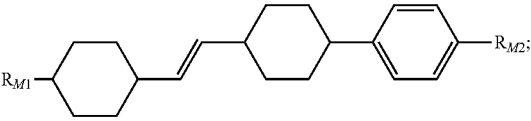

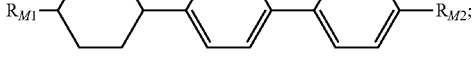

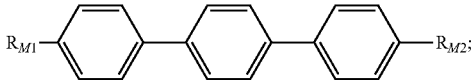

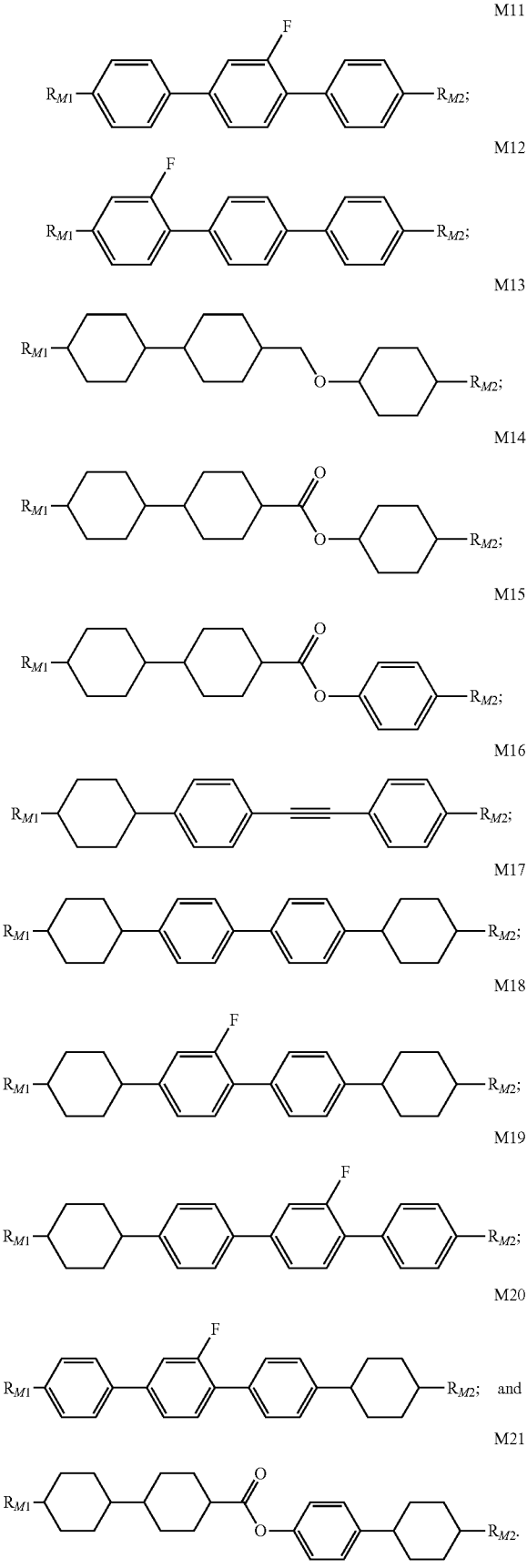

In some embodiments of the present invention, the content of the compound of general Formula M needs to be appropriately adjusted based on the required properties, such as solubility at low temperature, transition temperature, electrical reliability, birefringence, process adaptability, drip marks, screen burn-in, dielectric anisotropy and the like.

Preferred weight percentage of the compound of general Formula M in the liquid crystal composition of the present invention. The preferred lower limit of the weight percentage of the compound of general Formula M in the liquid crystal composition of the present invention is 1%, 2%, 3%, 5%, 7%, 10%, 12%, 14%, 16%, 18%, 20%, 22%, 24%, 26%, 28%, 30%, 32%, 34%, 36%, 38%, 40%, 42%, 45%, 48% or 50%, relative to the total weight of the liquid crystal composition of the present invention; and the preferred upper limit of the weight percentage of the compound of general Formula M in the liquid crystal composition of the present invention is 80%, 75%, 70%, 65%, 60%, 55%, 50%, 45%, 40%, 38%, 35%, 33%, 30%, 28%, 25%, 22% or 20%, relative to the total weight of the liquid crystal composition of the present invention.

In some embodiments of the present invention, the compound of general Formula M provides 1%-80% by weight of the total weight of the liquid crystal composition.

In some embodiments of the present invention, the compound of general Formula M is particularly preferably selected from a group consisting of the compounds of general Formula M1, general Formula M2, general Formula M3, general Formula M7, general Formula M8, general Formula M9, general Formula M11, general Formula M12, general Formula M13, general Formula M14, general Formula M17, general Formula M18, general Formula M19, general Formula M20 and general Formula 21.

In some embodiments of the present invention, the compound of general Formula M is preferably selected from a group consisting of the compounds of general Formula M1, general Formula M3, general Formula M7, general Formula M8 and general Formula M13.

In some embodiments of the present invention, with emphasis in reliability, the group consisting of the compounds of general Formula M1, general Formula M2, general Formula M3, general Formula M7, general Formula M8, general Formula M9, general Formula M11, general Formula M12, general Formula M13, general Formula M14, general Formula M17, general Formula M18, general Formula M19, general Formula M20 and general Formula 21 includes compound wherein both $R_{M1}$ and $R_{M2}$ are alkyl; with emphasis in reducing the volatility of the compound, the group consisting of the compounds of general Formula M1, general Formula M2, general Formula M3, general Formula M7, general Formula M8, general Formula M9, general Formula M11, general Formula M12, general Formula M13, general Formula M14, general Formula M17, general Formula M18, general Formula M19, general Formula M20 and general Formula 21 includes compound wherein both $R_{M1}$ and $R_{M2}$ are alkoxy; and with emphasis in reducing the viscosity, the group consisting of the compounds of general Formula M1, general Formula M2, general Formula M3, general Formula M7, general Formula M8, general Formula M9, general Formula M11, general Formula M12, general Formula M13, general Formula M14, general Formula M17, general Formula M18, general Formula M19, general Formula M20 and general Formula 21 includes compound wherein at least one of $R_{M1}$ and $R_{M2}$ is alkenyl.

In some embodiments of the present invention, the compound of general Formula M1 is particularly preferably selected from a group consisting of the following compounds:

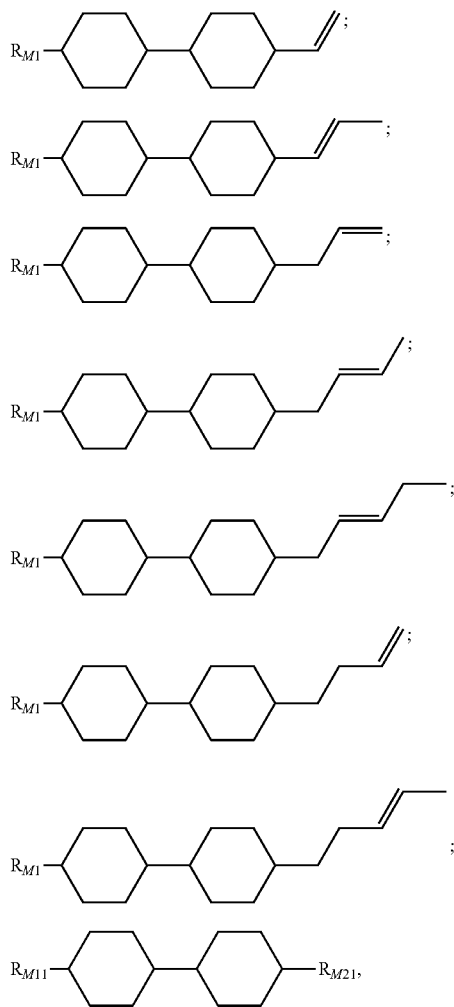

in which, $R_{M1}$ represents $C_{1-8}$ linear or branched halogenated or unhalogenated alkyl or alkoxy, or $C_{2-8}$ linear or branched halogenated or unhalogenated alkenyl or alkenoxy; and $R_{M11}$ and $R_{M21}$ each independently represents $C_{1-8}$ linear or branched halogenated or unhalogenated alkyl or alkoxy.

Preferred weight percentage of the compound of general Formula M1 in the liquid crystal composition of the present invention. The preferred lower limit of the weight percentage of the compound of general Formula M1 in the liquid crystal composition of the present invention is 1%, 2%, 3%, 5%, 7%, 10%, 15%, 20%, 25%, 30%, 35%, 40%, 45%, 50% or 55%, relative to the total weight of the liquid crystal composition of the present invention; and the preferred upper limit of the weight percentage of the compound of general Formula M1 in the liquid crystal composition of the present invention is 70%, 65%, 60%, 55%, 50%, 45%, 40%, 35%, 30% or 25%, relative to the total weight of the liquid crystal composition of the present invention.

In some embodiments of the present invention, the compound of general Formula M1 is preferably selected from a group consisting of the compounds of general Formula M1-a and general Formula M1-b.

In some embodiments of the present invention, $R_{M1}$ is preferably $C_{1-5}$ linear or branched halogenated or unhalogenated alkyl, or $C_{2-5}$ linear or branched halogenated or unhalogenated alkenyl; further preferably $C_{2-5}$ linear or branched halogenated or unhalogenated alkyl or alkenyl.

In some embodiments of the present invention, compounds of general Formula M1-a and general Formula M1-b wherein $R_{M1}$ is ethyl or n-propyl are particularly preferred in order to particularly improve response time.

For the weight percentage (relative to the total weight of the liquid crystal composition of the present invention) of the compound of general Formula M1-a wherein $R_{M1}$ represents ethyl or n-propyl in the liquid crystal composition of the present invention, the preferred lower limit thereof is 0%, 1%, 5%, 10%, 15%, 17%, 20%, 23%, 25%, 27% or 30%; the preferred upper limit thereof is 60%, 55%, 50%, 45%, 42%, 40%, 38%, 35%, 33%, 30%, 28% or 25%.

For the weight percentage (relative to the total weight of the liquid crystal composition of the present invention) of the compound of general Formula M1-b wherein $R_{M1}$ represents n-propyl in the liquid crystal composition of the present invention, the preferred lower limit thereof is 0%, 1%, 2%, 3%, 5%, 7% or 10%; and the preferred upper limit thereof is 30%, 25%, 20%, 15%, 13%, 10%, 8%, 7%, 6%, 5% or 3%.

In some embodiments of the present invention, when a higher clearing point is obtained by the compound of general Formula M1, $R_{M1}$ in the compound of general Formula M1 preferably represents butyl or pentyl; further preferably n-butyl or n-pentyl.

For the weight percentage (relative to the total weight of the liquid crystal composition of the present invention) of the compound of general Formula M1-a and/or general Formula M1-b wherein $R_{M1}$ represents n-butyl or n-pentyl in the liquid crystal composition of the present invention, the preferred lower limit thereof is 0%, 1%, 3%, 5%, 8%, 10%, 15%, 17%, 20%, 23%, 25%, 27% or 30%; and the preferred upper limit thereof is 60%, 55%, 50%, 45%, 42%, 40%, 38%, 35%, 33%, 30%, 28%, 25%, 23% or 20%.

For the weight percentage (relative to the total weight of the liquid crystal composition of the present invention) of the compound of general Formula M1-c in the liquid crystal composition of the present invention, the preferred lower limit thereof is 0%, 1%, 5%, 10%, 13%, 15%, 17% or 20%; and the preferred upper limit thereof is 25%, 23%, 20%, 17%, 15%, 13% or 10%.

For the weight percentage (relative to the total weight of the liquid crystal composition of the present invention) of the compound of general Formula M1-d in the liquid crystal composition of the present invention, the preferred lower limit thereof is 0%, 1%, 5%, 10%, 13%, 15%, 17% or 20%; and the preferred upper limit thereof is 25%, 23%, 20%, 17%, 15%, 13% or 10%.

For the weight percentage (relative to the total weight of the liquid crystal composition of the present invention) of the compound of general Formula M1-e in the liquid crystal composition of the present invention, the preferred lower limit thereof is 0%, 1%, 5%, 10%, 13%, 15%, 17% or 20%; the preferred upper limit thereof is 25%, 23%, 20%, 17%, 15%, 13% or 10%.

For the weight percentage (relative to the total weight of the liquid crystal composition of the present invention) of the compound of general Formula M1-f in the liquid crystal composition of the present invention, the preferred lower limit thereof is 0%, 1%, 5%, 10%, 13%, 15%, 17% or 20%; the preferred upper limit thereof is 25%, 23%, 20%, 17%, 15%, 13% or 10%.

For the weight percentage (relative to the total weight of the liquid crystal composition of the present invention) of the compound of general Formula M1-g in the liquid crystal composition of the present invention, the preferred lower limit thereof is 0%, 1%, 5%, 10%, 13%, 15%, 17% or 20%; the preferred upper limit thereof is 25%, 23%, 20%, 17%, 15%, 13% or 10%.

In some embodiments of the present invention, the compounds of general Formula M1-f and/or general Formula M1-g wherein $R_{M1}$ is ethyl or n-propyl are preferred.

For the weight percentage (relative to the total weight of the liquid crystal composition of the present invention) of the compound of general Formula M1-f and/or general Formula M1-g wherein $R_{M1}$ is ethyl or n-propyl in the liquid crystal composition of the present invention, the preferred lower limit thereof is 0%, 1%, 2%, 3%, 5%, 7%, 10%, 13%, 15%, 18% or 20%; the preferred upper limit thereof is 20%, 17%, 15%, 13%, 10%, 8%, 7% or 6%.

In some embodiments of the present invention, $R_{M11}$ in the compound of general Formula M1-h is preferably $C_{1-7}$ linear or branched alkyl or alkoxy; further preferably $C_{1-5}$ linear or branched alkyl or alkoxy.

For the weight percentage (relative to the total weight of the liquid crystal composition of the present invention) of the compound of general Formula M1-h in the liquid crystal composition of the present invention, the preferred lower limit thereof is 0%, 1%, 3%, 5%, 7%, 10%, 13%, 15%, 17%, 20%, 23%, 25% or 30%; the preferred upper limit thereof is 60%, 55%, 50%, 45%, 40%, 37%, 35%, 33%, 30%, 27%, 25%, 23%, 20%, 17%, 15%, 13% or 10%.

In some embodiments of the present invention, the compound of general Formula M1-h wherein $R_{M11}$ is ethyl, n-propyl, butyl or pentyl and $R_{M21}$ is methyl or methoxy, the compound of general Formula M1-h wherein $R_{M11}$ is ethyl, n-propyl, butyl or pentyl and $R_{M21}$ is ethyl or ethoxy, or the compound of general Formula M1-h wherein $R_{M11}$ is n-propyl, butyl or pentyl and $R_{M21}$ is n-propyl or propoxy is preferred in order to particularly improve the response time of the liquid crystal composition of the present invention.

For the weight percentage (relative to the total weight of the liquid crystal composition of the present invention) of the compound of general Formula M1-h wherein $R_{M11}$ is n-propyl and $R_{M21}$ is ethyl in the liquid crystal composition of the present invention, the preferred lower limit thereof is 0%, 1%, 2%, 3%, 5%, 7%, 10%, 13%, 15%, 18% or 20%; the preferred upper limit thereof is 20%, 17%, 15%, 13%, 10%, 8%, 7% or 6%.

Preferred weight percentage of the compound of general Formula M2 in the liquid crystal composition of the present invention. The preferred lower limit of the weight percentage of the compound of general Formula M2 in the liquid crystal composition of the present invention is 0%, 1%, 2%, 3%, 5%, 7% or 10%, relative to the total weight of the liquid crystal composition of the present invention; and the preferred upper limit of the weight percentage of the compound of general Formula M2 in the liquid crystal composition of the present invention is 20%, 15%, 13%, 10%, 8%, 7%, 6%, 5% or 3%, relative to the total weight of the liquid crystal composition of the present invention.

Preferred weight percentage of the compound of general Formula M3 in the liquid crystal composition of the present invention. The preferred lower limit of the weight percentage of the compound of general Formula M3 in the liquid crystal composition of the present invention is 0%, 1%, 2%, 3%, 5%, 7% or 10%, relative to the total weight of the liquid crystal composition of the present invention; and the preferred upper limit of the weight percentage of the compound of general Formula M3 in the liquid crystal composition of the present invention is 20%, 15%, 13%, 10%, 8%, 7%, 6%, 5% or 3%, relative to the total weight of the liquid crystal composition of the present invention.

Preferred weight percentage of the compound of general Formula M7 in the liquid crystal composition of the present invention. The preferred lower limit of the weight percentage of the compound of general Formula M7 in the liquid crystal composition of the present invention is 0%, 1%, 2%, 3%, 5%, 7%, 10%, 14%, 16%, 20%, 23%, 26%, 30%, 35% or 40%, relative to the total weight of the liquid crystal composition of the present invention; and the preferred upper limit of the weight percentage of the compound of general Formula M7 in the liquid crystal composition of the present invention is 50%, 40%, 35%, 30%, 20%, 15%, 10% or 5%, relative to the total weight of the liquid crystal composition of the present invention.

In some embodiments of the present invention, the compound of general Formula M7 wherein $R_{M1}$ is $C_{2-4}$ linear or branched halogenated or unhalogenated alkenyl (further preferably,

and $R_{M2}$ is $CH_3$— is preferred in accordance with the required properties, such as solubility at low temperature, transition temperature, electrical reliability, birefringence and the like.

For the weight percentage (relative to the total weight of the liquid crystal composition of the present invention) of the compound of general Formula M7 wherein $R_{M1}$ is

and $R_{M2}$ is $CH_3$— in the liquid crystal composition of the present invention, the preferred lower limit thereof is 0%, 1%, 3%, 5%, 7%, 9%, 11%, 12%, 13%, 18% or 21%; the preferred upper limit thereof is 45%, 40%, 35%, 30%, 25%, 23%, 20%, 18%, 15%, 13%, 10% or 8%. When both the compound wherein $R_{M1}$ is

and $R_{M2}$ is $CH_3$— and the compound wherein $R_{M1}$ is

(V8)

and $R_{M2}$ is $CH_3$— of general Formula M7 are simultaneously included in the liquid crystal composition of the present invention, the preferred lower limit of the weight percentage of both is 2%, 3%, 5%, 7%, 9%, 11%, 13%, 15%, 19%, 24% or 30%, relative to the total weight of the liquid crystal composition of the present invention, and the preferred upper limit of the weight percentage of both is 45%, 40%, 35%, 30%, 25%, 23%, 20%, 18%, 15%, 13%, 11%, 9%, 7% or 5%, relative to the total weight of the liquid crystal composition of the present invention.

Preferred weight percentage of the compound of general Formula M8 in the liquid crystal composition of the present invention. The preferred lower limit of the weight percentage of the compound of general Formula M8 in the liquid crystal composition of the present invention is 0%, 1%, 2%, 3%, 4%, 5%, 7%, 10%, 14%, 16% or 20%, relative to the total weight of the liquid crystal composition of the present invention; and the preferred upper limit of the weight percentage of the compound of general Formula M8 in the liquid crystal composition of the present invention is 40%, 35%, 30%, 20%, 15%, 10% or 5%, relative to the total weight of the liquid crystal composition of the present invention.

In some embodiments of the present invention, the compound of general Formula M8 wherein $R_{M1}$ is $C_{2-4}$ linear or branched halogenated or unhalogenated alkenyl (further preferably,

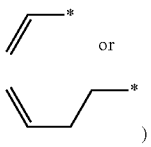
(V1) or
(V8)
)

and $R_{M2}$ is $CH_3$— is preferred in accordance with the required properties, such as solubility at low temperature, transition temperature, electrical reliability, birefringence and the like.

For the weight percentage (relative to the total weight of the liquid crystal composition of the present invention) of the compound of general Formula M8 wherein $R_{M1}$ is

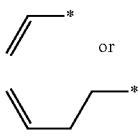
(V1) or
(V8)

and $R_{M2}$ is $CH_3$— in the liquid crystal composition of the present invention, the preferred lower limit thereof is 0%, 1%, 3%, 4%, 5%, 7%, 9%, 11%, 12%, 13%, 18% or 20%; the preferred upper limit thereof is 40%, 35%, 30%, 25%, 23%, 20%, 18%, 15%, 13%, 10% or 8%. When both the compound wherein $R_{M1}$ is

(V1)

and $R_{M2}$ is $CH_3$— and the compound wherein $R_{M1}$ is

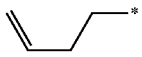
(V8)

and $R_{M2}$ is $CH_3$— of general Formula M8 are simultaneously included in the liquid crystal composition of the present invention, the preferred lower limit of the weight percentage of both is 3%, 5%, 7%, 9%, 11%, 13%, 15%, 19%, 24% or 30%, and the preferred upper limit of the weight percentage of both is 40%, 35%, 30%, 25%, 23%, 20%, 18%, 15% or 13%.

Preferred weight percentage of the compound of general Formula M9 in the liquid crystal composition of the present invention. The preferred lower limit of the weight percentage of the compound of general Formula M9 in the liquid crystal composition of the present invention is 0%, 1%, 2%, 3%, 5%, 7%, 10%, 14%, 16%, 20%, 23%, 26%, 30%, 35% or 40%, relative to the total weight of the liquid crystal composition of the present invention; and the preferred upper limit of the weight percentage of the compound of general Formula M9 in the liquid crystal composition of the present invention is 50%, 40%, 35%, 30%, 20%, 15%, 10% or 5%, relative to the total weight of the liquid crystal composition of the present invention.

In some embodiments of the present invention, the compound of general Formula M9 is preferably a compound wherein $R_{M1}$ is ethyl, propyl, butyl or pentyl and $R_{M2}$ is methyl or ethyl, a compound wherein $R_{M1}$ is

(V1)

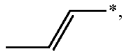
(V2)

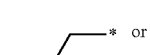
(V5)
or

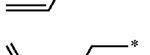
(V8)

and $R_{M2}$ is methyl, ethyl or n-propyl, or a compound wherein $R_{M1}$ is n-propyl, n-butyl or n-pentyl and $R_{M2}$ is $CH_3O$—.

Preferred weight percentage of the compound of general Formula M11 in the liquid crystal composition of the present invention. The preferred lower limit of the weight percentage of the compound of general Formula M11 in the liquid crystal composition of the present invention is 0%, 1%, 2%, 3%, 5%, 7%, 10%, 14%, 16%, 20%, 23%, 26%, 30%, 35% or 40%, relative to the total weight of the liquid crystal composition of the present invention; and the preferred upper limit of the weight percentage of the compound of general Formula M11 in the liquid crystal composition of the present invention is 50%, 40%, 35%, 30%, 20%, 15%, 10% or 5%, relative to the total weight of the liquid crystal composition of the present invention.

In some embodiments of the present invention, the compound of general Formula M11 wherein $R_{M1}$ and $R_{M2}$ each independently represents $C_{2-5}$ linear or branched halogenated or unhalogenated alkyl is preferred, or the compound of general Formula M11 wherein one of $R_{M1}$ and $R_{M2}$ is

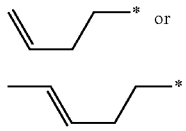

and the other is $CH_3$— or $C_2H_5$— is preferred.

Preferred weight percentage of the compound of general Formula M12 in the liquid crystal composition of the present invention. The preferred lower limit of the weight percentage of the compound of general Formula M12 in the liquid crystal composition of the present invention is 0%, 1%, 2%, 3%, 5%, 7%, 10%, 12%, 14%, 16%, 18%, 20%, 23%, 26%, 30%, 35% or 40%, relative to the total weight of the liquid crystal composition of the present invention; and the preferred upper limit of the weight percentage of the compound of general Formula M12 in the liquid crystal composition of the present invention is 50%, 40%, 35%, 30%, 25%, 22%, 20%, 18%, 15%, 12%, 10%, 8% or 5%, relative to the total weight of the liquid crystal composition of the present invention.

Preferred weight percentage of the compound of general Formula M13 in the liquid crystal composition of the present invention. The preferred lower limit of the weight percentage of the compound of general Formula M13 in the liquid crystal composition of the present invention is 0%, 1%, 2%, 3%, 5%, 7%, 10%, 12%, 14%, 16%, 18%, 20%, 23%, 26%, 30%, 35% or 40%, relative to the total weight of the liquid crystal composition of the present invention; and the preferred upper limit of the weight percentage of the compound of general Formula M13 in the liquid crystal composition of the present invention is 50%, 40%, 35%, 30%, 25%, 22%, 20%, 18%, 15%, 12%, 10%, 8% or 5%, relative to the total weight of the liquid crystal composition of the present invention.

Preferred weight percentage of the compound of general Formula M14 in the liquid crystal composition of the present invention. The preferred lower limit of the weight percentage of the compound of general Formula M14 in the liquid crystal composition of the present invention is 0%, 1%, 2%, 3%, 5%, 7%, 10%, 12%, 14%, 16%, 18%, 20%, 23%, 26%, 30%, 35% or 40%, relative to the total weight of the liquid crystal composition of the present invention; and the preferred upper limit of the weight percentage of the compound of general Formula M14 in the liquid crystal composition of the present invention is 50%, 40%, 35%, 30%, 25%, 22%, 20%, 18%, 15%, 12%, 10%, 8% or 5%, relative to the total weight of the liquid crystal composition of the present invention.

Preferred weight percentage of the compound of general Formula M15 in the liquid crystal composition of the present invention. The preferred lower limit of the weight percentage of the compound of general Formula M15 in the liquid crystal composition of the present invention is 0%, 1%, 2%, 3%, 5%, 7%, 10%, 12%, 14%, 16%, 18%, 20%, 23%, 26%, 30%, 35% or 40%, relative to the total weight of the liquid crystal composition of the present invention; and the preferred upper limit of the weight percentage of the compound of general Formula M15 in the liquid crystal composition of the present invention is 50%, 40%, 35%, 30%, 25%, 22%, 20%, 18%, 15%, 12%, 10%, 8% or 5%, relative to the total weight of the liquid crystal composition of the present invention.

Preferred total weight percentages of the compounds of general Formula M17 to general Formula M21 in the liquid crystal composition of the present invention. The preferred lower limit of the total weight percentage of the compounds of general Formula M17 to general Formula M21 in the liquid crystal composition of the present invention is 0%, 1%, 2%, 3%, 5%, 7%, 10%, 14%, 16% or 20%, relative to the total weight of the liquid crystal composition of the present invention; and the preferred upper limit of the total weight percentage of the compounds of general Formula M17 to general Formula M21 in the liquid crystal composition of the present invention is 30%, 25%, 23%, 20%, 18%, 15%, 12%, 10% or 5%, relative to the total weight of the liquid crystal composition of the present invention.

In addition to the above compounds, the liquid crystal composition of the present invention may also contain normal nematic liquid crystal compound, smectic liquid crystal compound, cholesteric liquid crystal compound, antioxidant, ultraviolet absorber, infrared absorber, polymerizable monomer or light stabilizer, etc.

Dopants which can be preferably added to the liquid crystal composition according to the present invention are shown below.

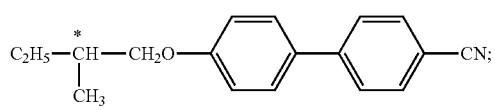

C 15

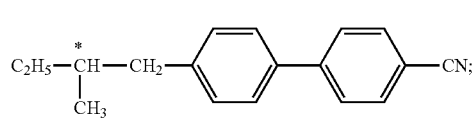

CB 15

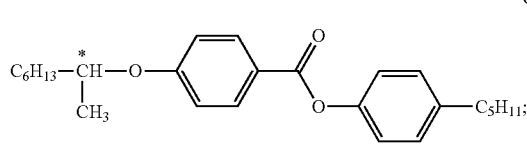

CM 21

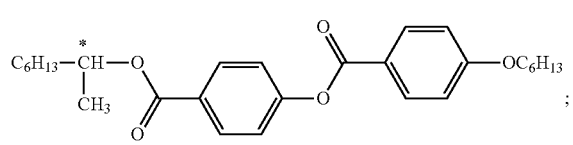

R/S-811

-continued

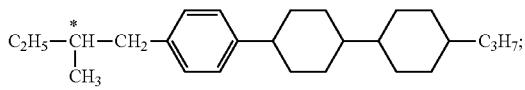
CM 44

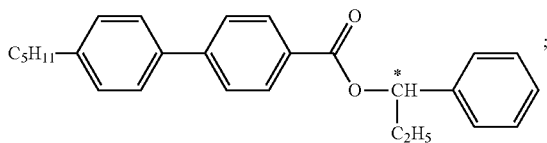
CM 45

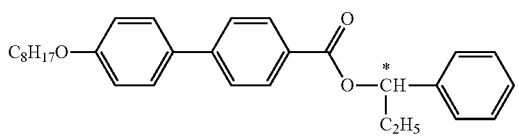
CM 47

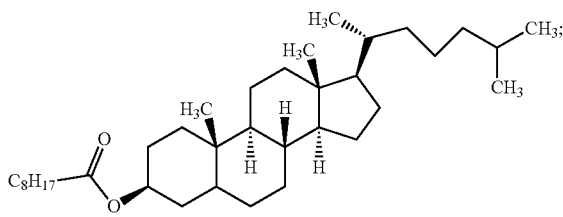
CN

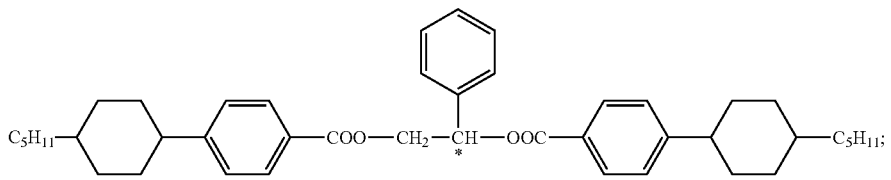
R/S-1011

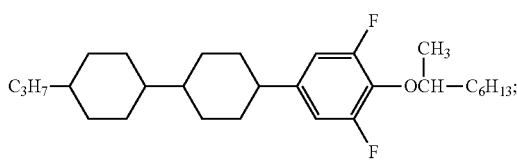
R/S-2011

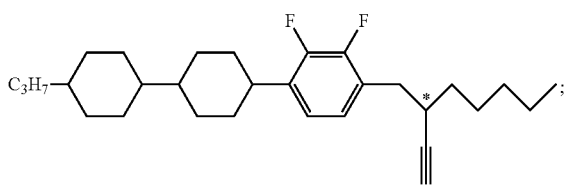
R/S-3011

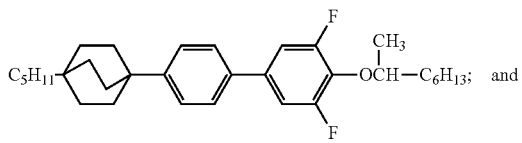
R/S-4011

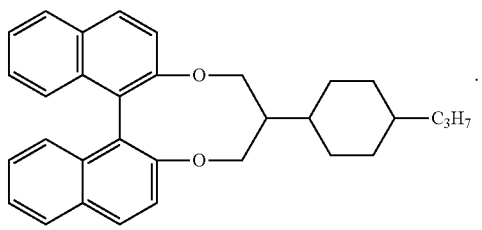
R/S-5011 and

In some embodiments of the present invention, preferably, the dopant provides 0-5% by weight of the total weight of the liquid crystal composition; more preferably, the dopant provides 0-1% by weight of the total weight of the liquid crystal composition.

Further, additives used in the liquid crystal composition of the present invention, such as antioxidant, light stabilizer and the like, are preferably selected from the following substances.

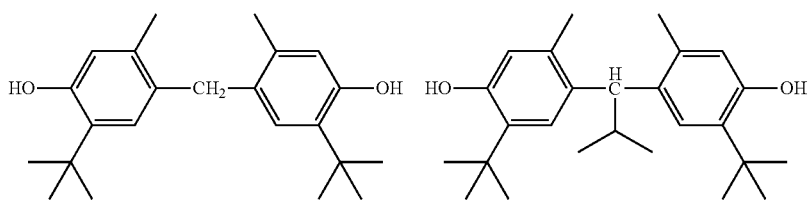

-continued
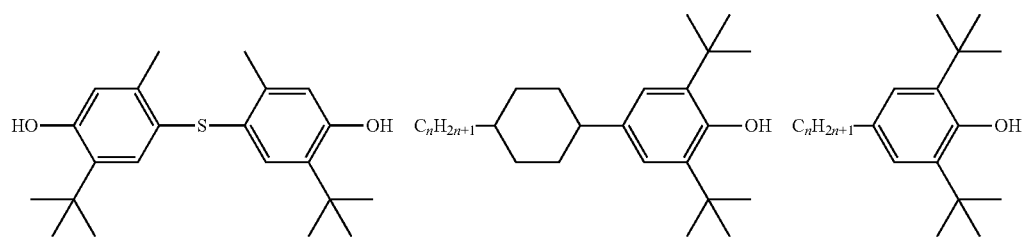
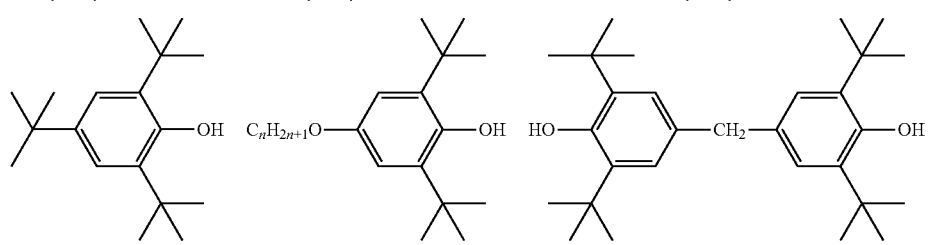
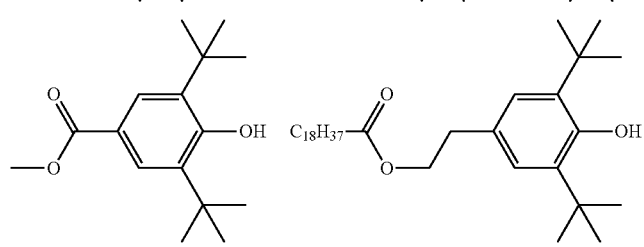
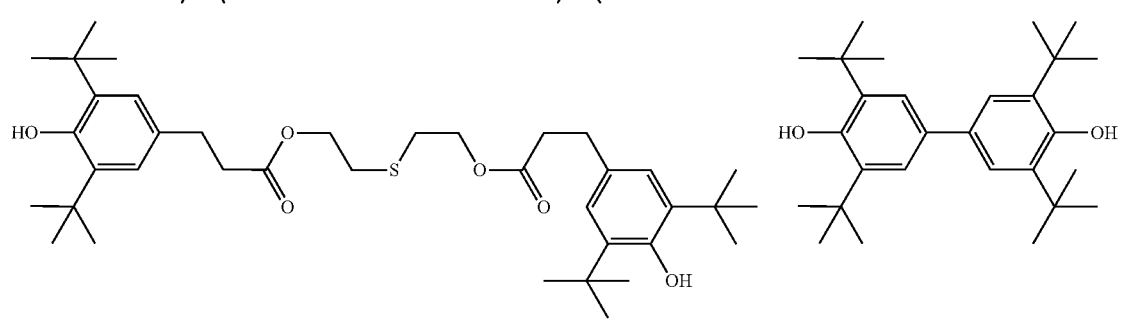
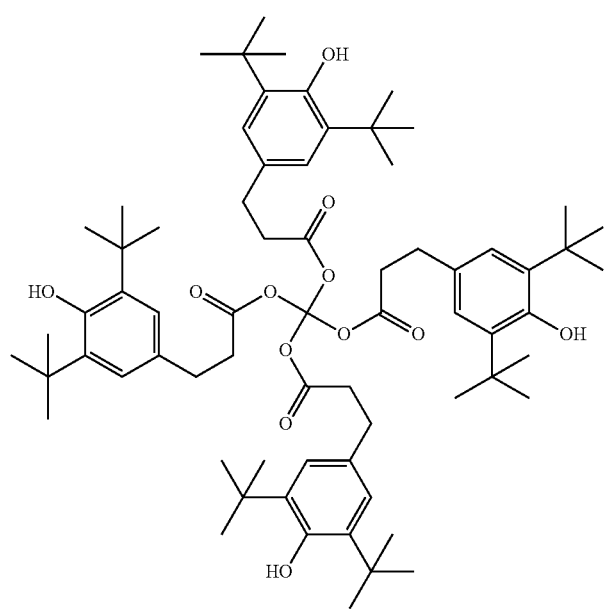

-continued
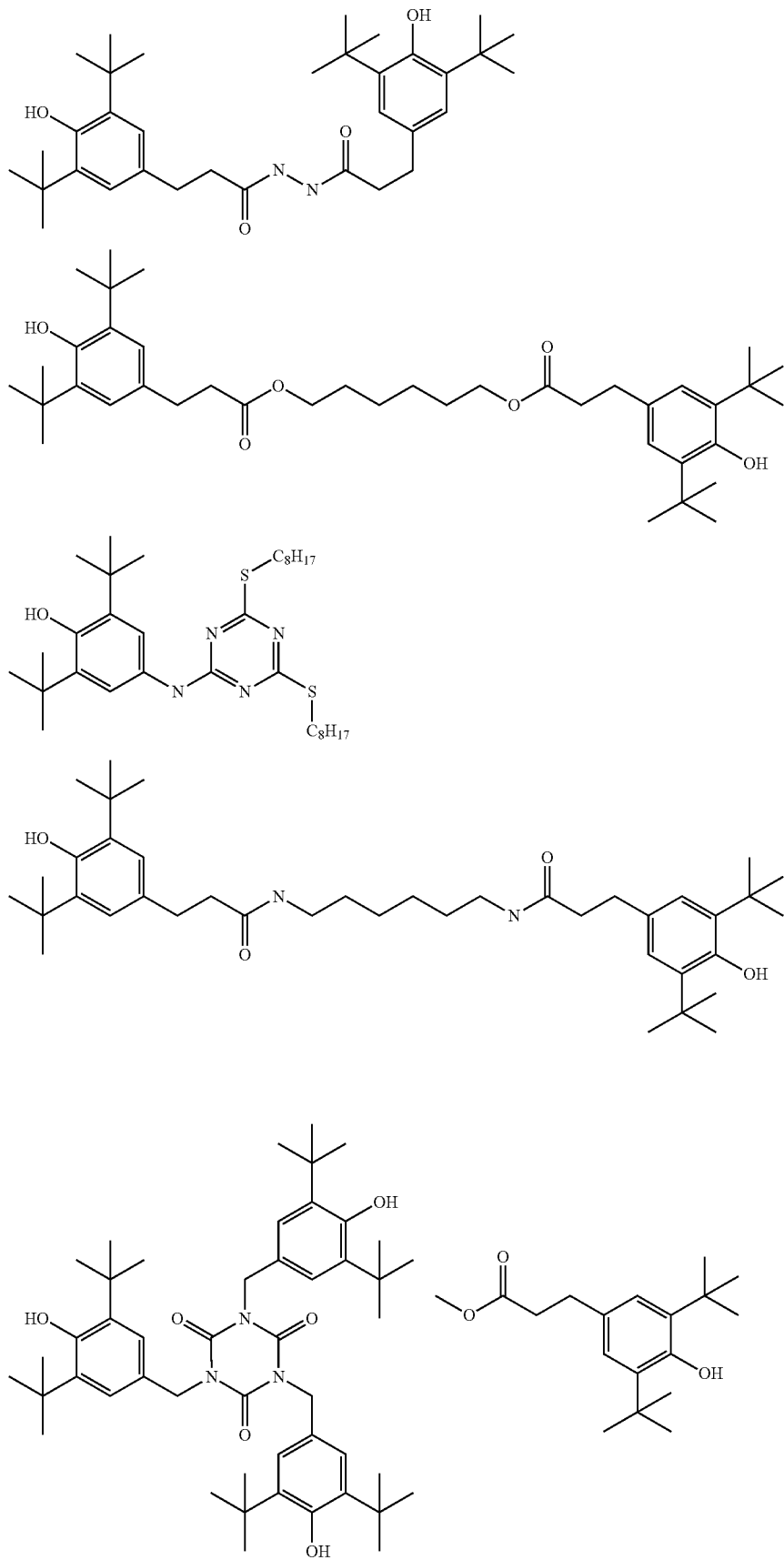

-continued
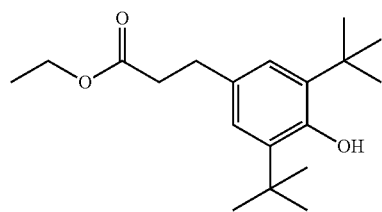
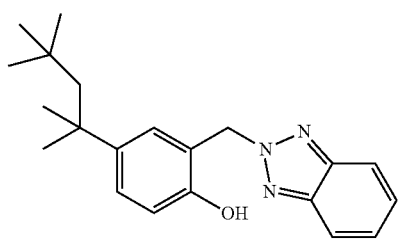
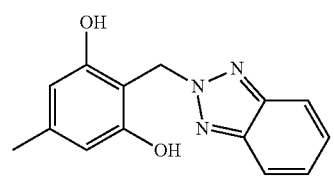
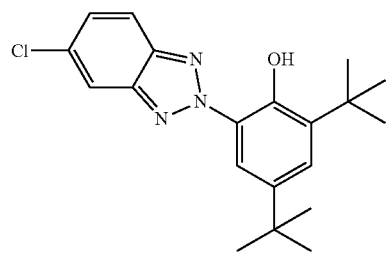
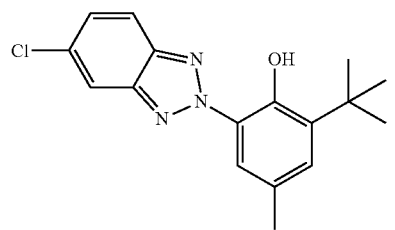
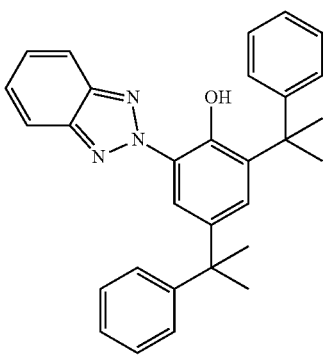
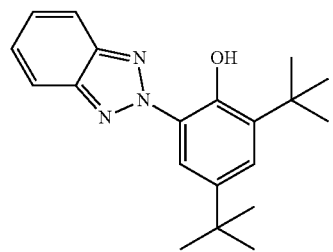
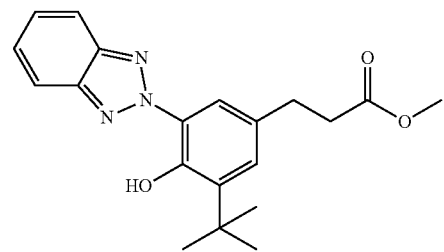
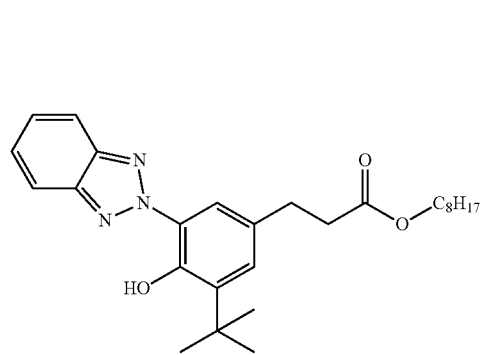
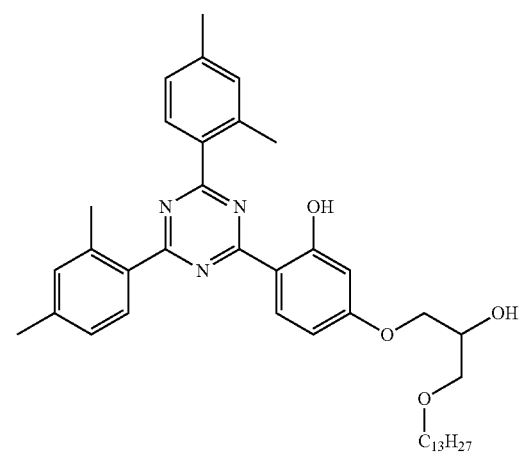

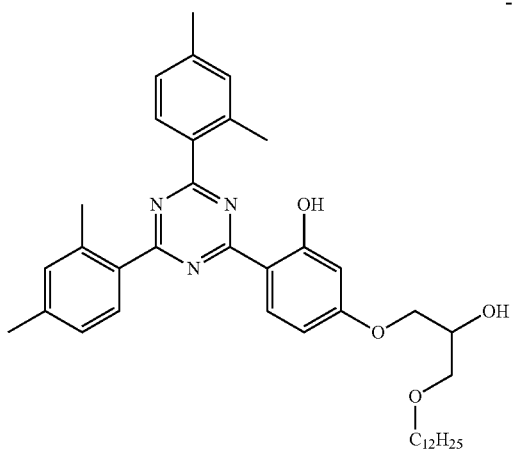
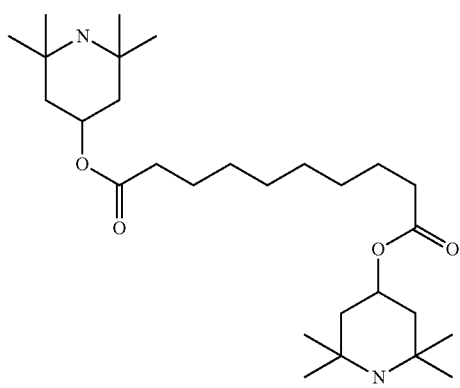
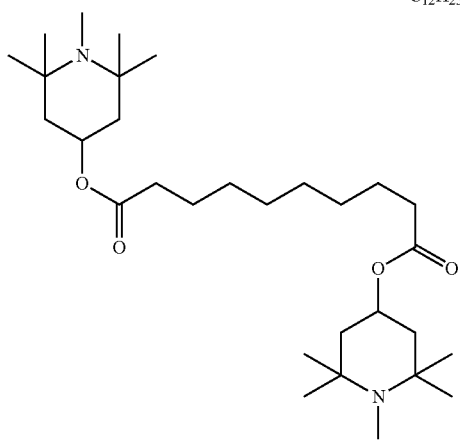

in which, n represents a positive integer of 1-12.

Preferably, the light stabilizer is selected from a group consisting of the light stabilizers as shown below.

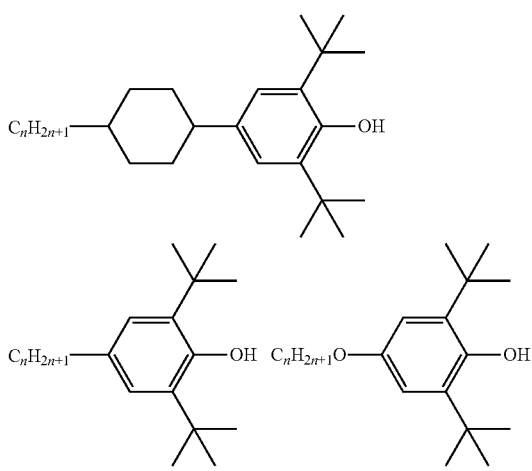

In some embodiments of the present invention, preferably, the light stabilizer provides 0-5% by weight of the total weight of the liquid crystal composition; more preferably, the light stabilizer provides 0-1% by weight of the total weight of the liquid crystal composition; particularly preferably, the light stabilizer provides 0-0.1% by weight of the total weight of the liquid crystal composition.

In still another aspect, the present invention provides a liquid crystal display device comprising the above liquid crystal composition.

The liquid crystal composition of the present invention has a dielectric anisotropy with an absolute value of no less than 4, preferably no less than 4.2, and further preferably no less than 4.5.

Beneficial Effects

The liquid crystal composition provided herein has a higher optical anisotropy, a higher clearing point, a higher dielectric anisotropy, a high transmittance and a larger average elastic constant. When the liquid crystal composition is used in the IPS liquid crystal display device, the transmittance of the display device can be effectively improved, so that the display device has a good display performance while also having good energy-saving and environment-friendly characteristics. In particular, when the compounds of general Formula I and general Formula N are added in the liquid crystal composition of the present invention, the transmittance of the liquid crystal composition can be effectively improved. The liquid crystal composition of the present invention comprising the compounds of general Formula I, general Formula II, general Formula M and general Formula N has a higher optical anisotropy, a higher clearing point and a high transmittance, while also having a higher dielectric anisotropy. Therefore, the liquid crystal display device comprising the liquid crystal composition of the present invention has a higher transmittance and good energy-saving and environment-friendly characteristics

DETAILED EMBODIMENTS

The present invention will be illustrated by combining the detailed embodiments below. It should be noted that, the following examples are exemplary embodiments of the present invention, which are only used to illustrate the present invention, not to limit it. Other combinations and various modifications within the conception of the present invention are possible without departing from the subject matter and scope of the present invention.

For the convenience of the expression, the group structures of the liquid crystal compositions in the following Examples are represented by the codes listed in Table 1:

TABLE 1

Codes of the group structures of the liquid crystal compounds

| Unit structure of group | Code | Name of the group |
|---|---|---|
| (1,4-cyclohexylidene ring) | C | 1,4-cyclohexylidene |
| (1-oxane-2,5-diyl ring) | A | 1-oxane-2,5-diyl |
| (1,3-dioxane-2,5-diyl ring) | D | 1,3-dioxane-2,5-diyl |
| (1,4-phenylene ring) | P | 1,4-phenylene |
| (2-fluoro-1,4-phenylene ring) | G | 2-fluoro-1,4-phenylene |
| (2,5-difluoro-1,4-phenylene ring) | U | 2,5-difluoro-1,4-phenylene |
| (2,3-difluoro-1,4-phenylene ring) | W | 2,3-difluoro-1,4-phenylene |
| —CH$_2$CH$_2$— | 2 | ethyl bridge bond |
| (difluorovinyl group) | V(2F) | difluorovinyl |
| —OCF$_3$ | OCF3 | trifluoromethoxy |
| —F | F | fluoro substituent |
| —O— | O | oxygen substituent |

TABLE 1-continued

Codes of the group structures of the liquid crystal compounds

| Unit structure of group | Code | Name of the group |
|---|---|---|
| —CF$_2$O— | 1(2F)O or Q | difluoromethoxy |
| —CH$_2$O— | 1O | methyleneoxy |
| —COO— | E | ester bridge bond |
| —C$_n$H$_{2n+1}$ | n (n represents a positive integer of 1-12) | alkyl |
| —CH=CH— or —CH=CH$_2$ | V | ethenyl |

Take the compound with the following structural formula as an example:

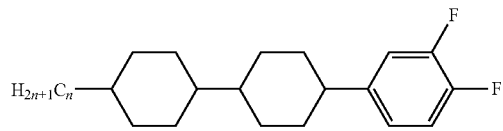

Represented by the codes listed in Table 1, this structural formula can be expressed as nCCGF, in which, n in the code represents the number of the carbon atoms of the alkyl group on the left, for example, n is "3", meaning that the alkyl is —C$_3$H$_7$; C in the code represents "cyclohexyl", G represent 2-fluoro-1,4-phenylene, F represents fluorine.

The abbreviated codes of the test items in the following Examples are represented as follows:

| | |
|---|---|
| Cp | clearing point (nematic-isotropy phases transition temperature, °C.) |
| Δn | optical anisotropy (589 nm, 25 °C.) |
| Δε | dielectric anisotropy (1 KHz, 25 °C.) |
| K$_{11}$ | splay elastic constant (pN at 25 °C.) |
| K$_{22}$ | twist elastic constant (pN at 25 °C.) |
| K$_{33}$ | bend elastic constant (pN at 25 °C.) |
| K$_{ave}$ | average elastic constant (the average value of K$_{11}$, K$_{22}$ and K$_{33}$) |
| T | Transmittance (DMS 505 tester, cell gap 3.5 μm) | in which, the optical anisotropy is measured with an Abbe refractometer under sodium lamp (589 nm) light source at 25° C.

Δε=ε$_I$−ε$_⊥$, in which, ε$_I$ is the dielectric constant parallel to the molecular axis, ε$_⊥$ is the dielectric constant perpendicular to the molecular axis, with the test conditions: 25° C., 1 KHz, TN90 type test cell with a cell gap of 7 μm.

K$_{11}$, K$_{22}$ and K$_{33}$ are calculated from the measured C-V curve of the liquid crystal using LCR meter and an antiparallel rubbed cell, with the following test conditions: a cell gap of 7 μm, V=0.1~20 V. K$_{ave}$=(K$_{11}$+K$_{22}$+K$_{33}$)/3.

Test condition of transmittance (T). The transmittance of the optic-tunable device is measured at the temperature of clearing point ±10° C. using DMS 505 tester. The optic-tunable device is a IPS mode liquid crystal testing cell with a cell gap of 3.5 μm.

The components used in the following Examples can either be synthesized by method known in the art or be obtained commercially. The synthetic techniques are conventional, and each of the obtained liquid crystal compounds is tested to meet the standards of electronic compound.

The liquid crystal compositions are prepared in accordance with the ratios specified in the following Examples through conventional methods in the art, such as heating, ultrasonic wave, or suspension.

The liquid crystal compositions of following Examples are prepared and then tested. The components and test results for the performances of the liquid crystal composition of each Example are shown below.

Comparative Example 1

The liquid crystal composition of Comparative Example 1 is prepared according to each compound and weight percentage listed in Table 2 and then tested for performance by filling the same between two substrates of a liquid crystal display device.

TABLE 2

Formulation of the liquid crystal composition and its test performances

| Code of component | Weight percentage | | Test results for the performance parameters |
|---|---|---|---|
| 3CCPOCF3 | 9 | $\Delta n$ | 0.095 |
| 1PP2V | 8.5 | $C_p$ | 87.5 |
| VCVCP1 | 4 | $K_{ave}$ | 11 |
| 3CCV | 41 | $\Delta\varepsilon$ | 3.1 |
| 3CCV1 | 5 | T | 12.45% |
| 3PGP2V(2F) | 2.5 | | |
| 3CPUF | 3 | | |
| 4CCPUF | 3 | | |
| 3CCPUF | 6 | | |
| 2PGUQPOCF3 | 5 | | |
| 3PGUQPOCF3 | 5 | | |
| 3CC1OWO2 | 4 | | |
| 4CC1OWO2 | 4 | | |
| Total | 100 | | |

Example 1

The liquid crystal composition of Example 1 is prepared according to each compound and weight percentage listed in Table 3 and then tested for performance by filling the same between two substrates of a liquid crystal display device.

TABLE 3

Formulation of the liquid crystal composition and its test performances

| Code of component | Weight percentage | | Test results for the performance parameters |
|---|---|---|---|
| 3CCPOCF3 | 7 | $\Delta n$ | 0.101 |
| 1PP2V | 8 | $C_p$ | 90.5 |
| VCCP1 | 8 | $K_{ave}$ | 12.8 |
| 3CCV | 35 | $\Delta\varepsilon$ | 4.3 |
| 3CCV1 | 12 | T | 14.26% |
| 3CDPUF | 3 | | |
| 3CD2PUF | 5 | | |
| 2PGUQPOCF3 | 3 | | |
| 3PGUQPOCF3 | 3 | | |
| 4PGUQPOCF3 | 3 | | |
| 3CPWO2 | 5 | | |
| 4CPWO2 | 5 | | |
| 3CCWWO2 | 3 | | |
| Total | 100 | | |

Example 2

The liquid crystal composition of Example 2 is prepared according to each compound and weight percentage listed in Table 4 and then tested for performance by filling the same between two substrates of a liquid crystal display device.

TABLE 4

Formulation of the liquid crystal composition and its test performances

| Code of component | Weight percentage | | Test results for the performance parameters |
|---|---|---|---|
| 3CCPOCF3 | 7.5 | $\Delta n$ | 0.098 |
| VCCP1 | 4 | $C_p$ | 92.3 |
| 3CCV | 41 | $K_{ave}$ | 13 |
| V2CCP1 | 4 | $\Delta\varepsilon$ | 4.6 |
| 3CCV1 | 9 | T | 14.87% |
| 3PGP2V(2F) | 2.5 | | |
| 3D2PUF | 3 | | |
| 3CDPUF | 6 | | |
| 3CD2PUF | 6 | | |
| 2APUQUF | 2 | | |
| 3APUQUF | 5 | | |
| 3CCWWO2 | 5 | | |
| 4CCWWO2 | 5 | | |
| Total | 100 | | |

Example 3

The liquid crystal composition of Example 3 is prepared according to each compound and weight percentage listed in Table 5 and then tested for performance by filling the same between two substrates of a liquid crystal display device.

TABLE 5

Formulation of the liquid crystal composition and its test performances

| Code of component | Weight percentage | | Test results for the performance parameters |
|---|---|---|---|
| 3CCPOCF3 | 3 | $\Delta n$ | 0.1 |
| 1PP2V | 4.5 | $C_p$ | 90.9 |
| VCVCP1 | 4 | $K_{ave}$ | 13.5 |
| 3CCV | 41 | $\Delta\varepsilon$ | 4.7 |
| V2CCP1 | 4 | T | 15.12% |
| 3CCV1 | 9 | | |
| 3PGP2V(2F) | 2.5 | | |
| 3D2PUF | 3 | | |
| 3CDPUF | 3 | | |
| 3CD2PUF | 6 | | |
| 2CDUQUF | 5 | | |
| 3APUQUF | 5 | | |
| 3CC1OWO2 | 5 | | |
| 4CC1OWO2 | 5 | | |
| Total | 100 | | |

Example 4

The liquid crystal composition of Example 4 is prepared according to each compound and weight percentage listed in Table 6 and then tested for performance by filling the same between two substrates of a liquid crystal display device.

TABLE 6

Formulation of the liquid crystal composition and its test performances

| Code of component | Weight percentage | Test results for the performance parameters | |
|---|---|---|---|
| 3CCPOCF3 | 3 | Δn | 0.105 |
| 1PP2V | 4.5 | Cp | 93.9 |
| 3CC1OC2 | 4 | $K_{ave}$ | 13.8 |
| 3CCV | 41 | Δε | 6.2 |
| V2CCP1 | 4 | T | 14.95% |
| 3CCV1 | 9 | | |
| 3PGPF | 2.5 | | |
| 3DC1OPGF | 5 | | |
| 3CDPUF | 5 | | |
| 3CD2PUF | 6 | | |
| 2CDUQUF | 5 | | |
| 3APUQUF | 6 | | |
| 3CPWO2 | 5 | | |
| Total | 100 | | |

Example 5

The liquid crystal composition of Example 5 is prepared according to each compound and weight percentage listed in Table 7 and then tested for performance by filling the same between two substrates of a liquid crystal display device.

TABLE 7

Formulation of the liquid crystal composition and the its performances

| Code of component | Weight percentage | Test results for the performance parameters | |
|---|---|---|---|
| 1PP2V | 4.5 | Δn | 0.113 |
| VCCP1 | 4 | Cp | 92.1 |
| 3CCV | 41 | $K_{ave}$ | 13.2 |
| V2CCP1 | 4 | Δε | 5.1 |
| 3CCV1 | 9 | T | 14.75% |
| 3PGPF | 2.5 | | |
| 3DC1OPGF | 3 | | |
| 3CDPUF | 3 | | |
| 3CD2PUF | 6 | | |
| 2CDUQUF | 5 | | |
| 3APUQUF | 5 | | |
| 3CDUQUF | 3 | | |
| 3CPWO2 | 5 | | |
| 4CPWO2 | 5 | | |
| Total | 100 | | |

Example 6

The liquid crystal composition of Example 6 is prepared according to each compound and weight percentage listed in Table 8 and then tested for performance by filling the same between two substrates of a liquid crystal display device.

TABLE 8

Formulation of the liquid crystal composition and its test performances

| Code of component | Weight percentage | Test results for the performance parameters | |
|---|---|---|---|
| 1PP2V | 5 | Δn | 0.108 |
| VCCP1 | 4 | Cp | 90.8 |
| 3CCV | 43.5 | $K_{ave}$ | 13.5 |
| V2CCP1 | 4 | Δε | 4.8 |
| 3CCV1 | 9 | T | 15.32% |
| 3DC1OPGF | 3 | | |
| 3CDPUF | 3 | | |
| 3CD2PUF | 6 | | |
| 2CDUQUF | 5 | | |
| 3APUQUF | 5 | | |
| 3PPWO2 | 5 | | |
| 4PPWO2 | 5 | | |
| 3CCWO2 | 2.5 | | |
| Total | 100 | | |

Based on the above Comparative Example 1 and Examples 1-6, it is indicated that the liquid crystal composition provided herein has a higher optical anisotropy, a higher clearing point, a higher dielectric anisotropy, a high transmittance and a larger average elastic constant. When applied in the IPS liquid crystal display devices, it can effectively increase the transmittance of the display devices and impart the display devices with good display performance and energy-saving and environment-friendly characteristics.

The above embodiments are merely illustrative of the technical concepts and the features of the present invention, are included merely for purposes of illustration and implement of the present invention, and are not intended to limit the scope of the present invention. Equivalent variations or modifications are intended to be included within the scope of the invention.

What is claimed is:

1. A liquid crystal composition comprising:

(a) at least one compound selected from the group consisting of:

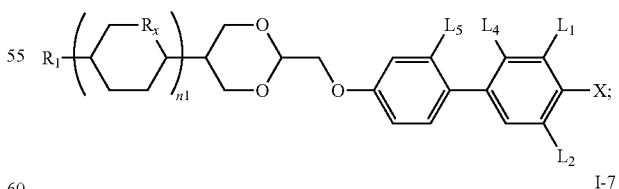

I-3

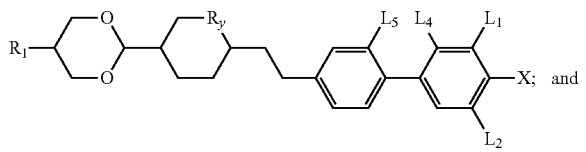

I-7 and

-continued

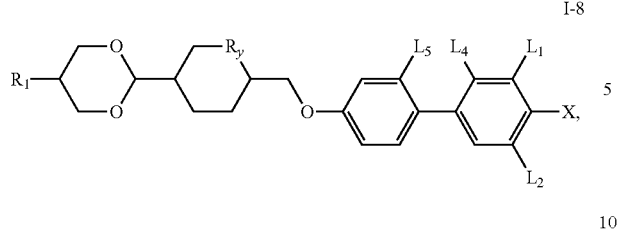
I-8 in which, $L_5$ represents —H or —F;

$R_x$ and $R_y$ each independently represents —CH$_2$— or —O—; and n1 represents 0 or 1;

(b) at least one compound of general Formula II

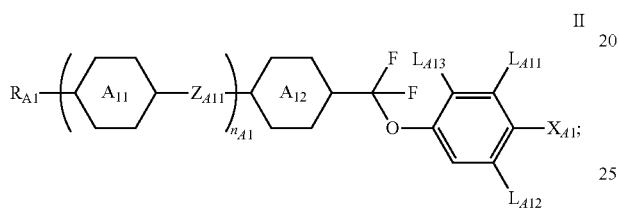
II (c) at least one compound of general Formula N

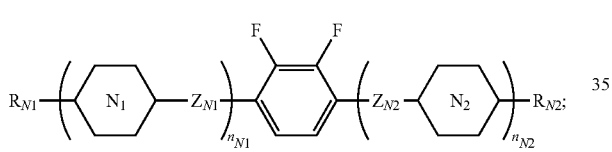
N and (d) at least one compound of general Formula M

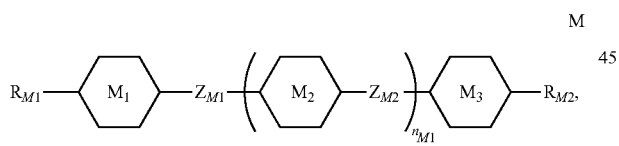
M in which, $R_1$ represents $C_{1-12}$ linear or branched alkyl, one or more nonadjacent —CH$_2$— in the $C_{1-12}$ linear or branched alkyl can each be independently replaced by —C=C—, —C≡C—, —O—, —CO—, —CO—O— or —O—CO—, and one or more —H in the $C_{1-12}$ linear or branched alkyl can each be independently substituted by —F or —Cl;

$R_{A1}$ represents $C_{1-12}$ linear or branched alkyl,

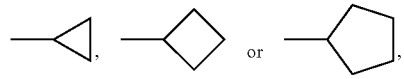

one or more nonadjacent —CH$_2$— in the $C_{1-12}$ linear or branched alkyl can each be independently replaced by —CH=CH—, —C≡C—, —O—, —CO—, —CO—O— or —O—CO—, and one or more —H in these groups can each be independently substituted by —F or —Cl;

$R_{N1}$ and $R_{N2}$ each independently represents $C_{1-12}$ linear or branched alkyl or alkoxy, or $C_{2-12}$ linear or branched alkenyl or alkenoxy, one or more nonadjacent —CH$_2$— in the $C_{1-12}$ linear or branched alkyl or alkoxy, or the $C_{2-12}$ linear or branched alkenyl or alkenoxy can each be independently replaced by —C≡C—, —O—, —CO—, —CO—O— or —O—CO—;

$R_{M1}$ and $R_{M2}$ each independently represents —H, —F,

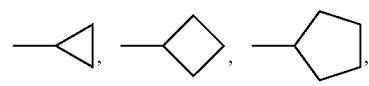

$C_{1-12}$ linear or branched halogenated or unhalogenated alkyl or alkoxy, or $C_{2-12}$ linear or branched halogenated or unhalogenated alkenyl or alkenoxy, one or more nonadjacent —CH$_2$— in the $C_{1-12}$ linear or branched halogenated or unhalogenated alkyl or alkoxy, or the $C_{2-12}$ linear or branched halogenated or unhalogenated alkenyl or alkenoxy can each be independently replaced by —C≡C—, —O—, —CO—, —CO—O— or —O—CO—;

ring

and ring

each independently represents

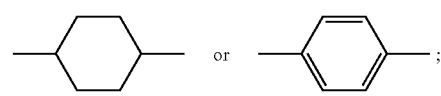

wherein one or more —CH$_2$— in

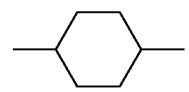

can be replaced by —O—, and one or more single bonds in the ring can be replaced by double bond; one or more —H on

can be substituted by —CN, —F or —Cl, and one or more —CH= in the ring can be replaced by —N=;
ring

and ring

each independently represents

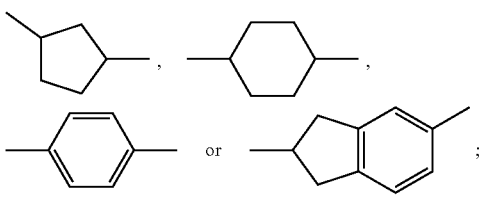

wherein one or more —CH$_2$— in

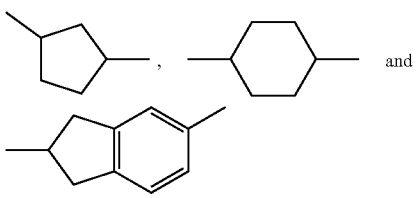

can be replaced by —O—, and one or more single bonds in the ring can be replaced by double bond; one or more —H on

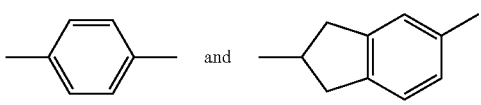

can be substituted by —CN, —F or —Cl, and one or more —CH= in the ring can be replaced by —N=;
ring

ring

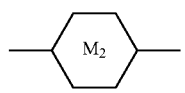

and ring

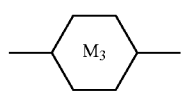

each independently represents

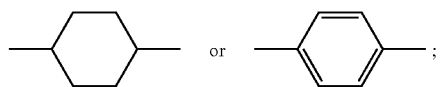

wherein, at most one —CH$_2$— in

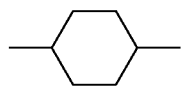

can be replaced by —O—, at most one —H on

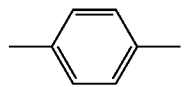

can be substituted by halogen;
$Z_{A11}$ represents single bond, —CH$_2$CH$_2$—, —CF$_2$CF$_2$—, —CF$_2$O—, —OCF$_2$—, —CO—O—, —O—CO—, —O—CO—O—, —CH=CH—, —C≡C—, —CF=CF—, —CH$_2$O— or —OCH$_2$—;
$Z_{M1}$ and $Z_{M2}$ each independently represents single bond, —CO—O—, —O—CO—, —CH$_2$O—, —OCH$_2$—, —CH=CH—, —C≡C—, —CH$_2$CH$_2$— or —(CH$_2$)$_4$—;
$Z_{N1}$ and $Z_{N2}$ each independently represents single bond, —CO—O—, —O—CO—, —CH$_2$O—, —OCH$_2$—, —CH=CH—, —C≡C—, —CH$_2$CH$_2$—, —(CH$_2$)$_4$—, —CF$_2$O—, —OCF$_2$— or —CF$_2$CF$_2$—;
$L_1$, $L_2$, and $L_4$ each independently represents —H, —CH$_3$ or halogen;
X represents halogen, C$_{1-5}$ halogenated alkyl or halogenated alkoxy, or C$_{2-5}$ halogenated alkenyl or halogenated alkenoxy;
$L_{A11}$, $L_{A12}$ and $L_{A13}$ each independently represents —H, —F, —CH$_3$ or —Cl;
$X_{A1}$ represents halogen, C$_{1-5}$ halogenated alkyl or halogenated alkoxy, or C$_{2-5}$ halogenated alkenyl or halogenated alkenoxy;
$n_{A1}$ represents 0, 1, 2 or 3, and when $n_{A1}$=2 or 3, ring

can be same or different, $Z_{A11}$ can be same or different;

$n_{M1}$ represents 0, 1, 2 or 3, and when $n_{M1}$=2 or 3, ring

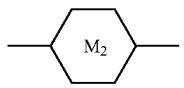

can be same or different, $Z_{M2}$ can be same or different; and $n_{N1}$ represents 0, 1, 2 or 3, $n_{N2}$ represents 0 or 1, and $0 \le n_{N1}+n_{N2} \le 3$; when $n_{N1}$=2 or 3, ring

can be same or different, and $Z_{N1}$ can be same or different.

2. The liquid crystal composition according to claim 1, wherein the at least one compound of Formulas I-3, I-7, and I-8 is 0.1%-60% by weight of the total weight of the liquid crystal composition.

3. The liquid crystal composition according to claim 1, wherein $R_{A1}$ represents $C_{1-8}$ linear or branched alkyl or alkoxy, or $C_{2-8}$ linear or branched alkenyl or alkenoxy.

4. The liquid crystal composition according to claim 1, wherein ring

and ring

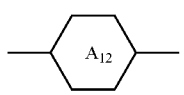

each independently represents

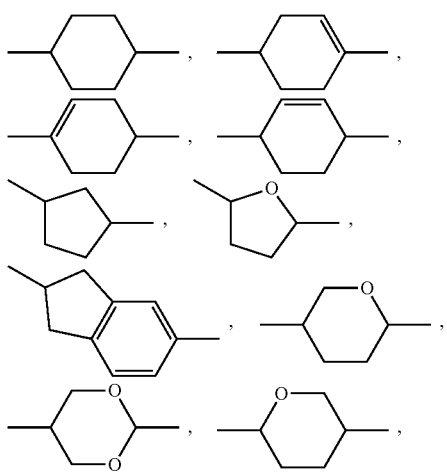

-continued

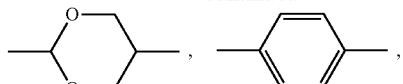

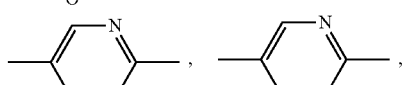

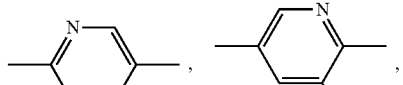

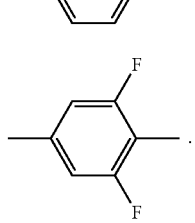

5. The liquid crystal composition according to claim 1, wherein the compound of general Formula II is 1%-75% by weight of the total weight of the liquid crystal composition.

6. The liquid crystal composition according to claim 1, wherein $R_{N1}$ and $R_{N2}$ each independently represents $C_{1-8}$ linear or branched alkyl or alkoxy, or $C_{2-8}$ linear or branched alkenyl or alkenoxy; ring

and ring

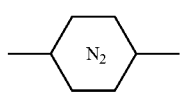

each independently represents

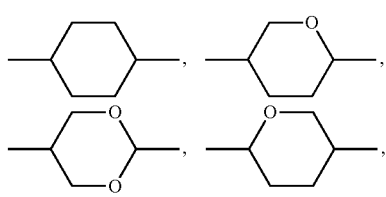

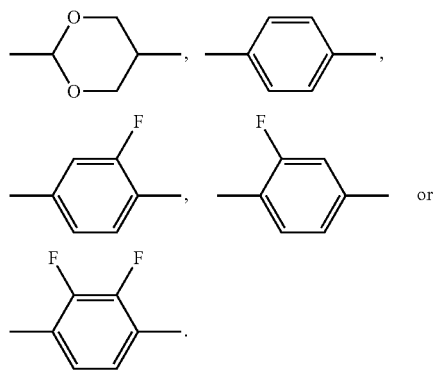
7. The liquid crystal composition according to claim 6, wherein the compound of general Formula N is selected form a group consisting of the following compounds:
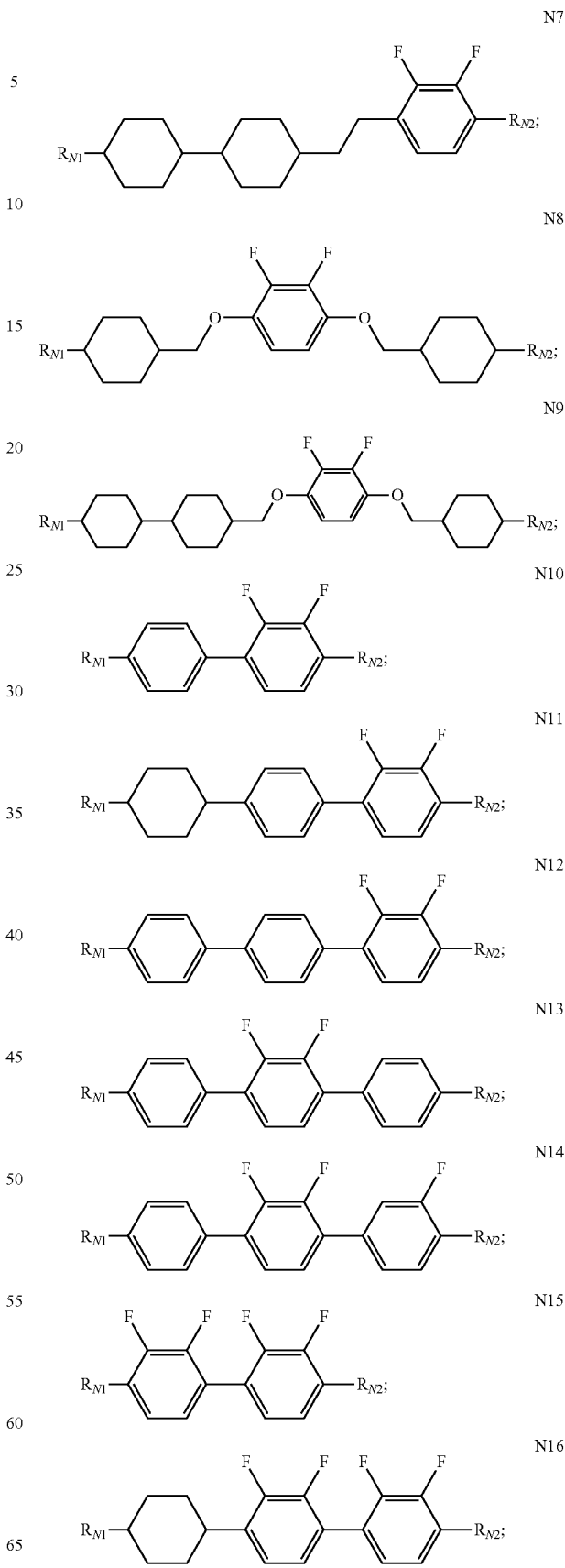

-continued

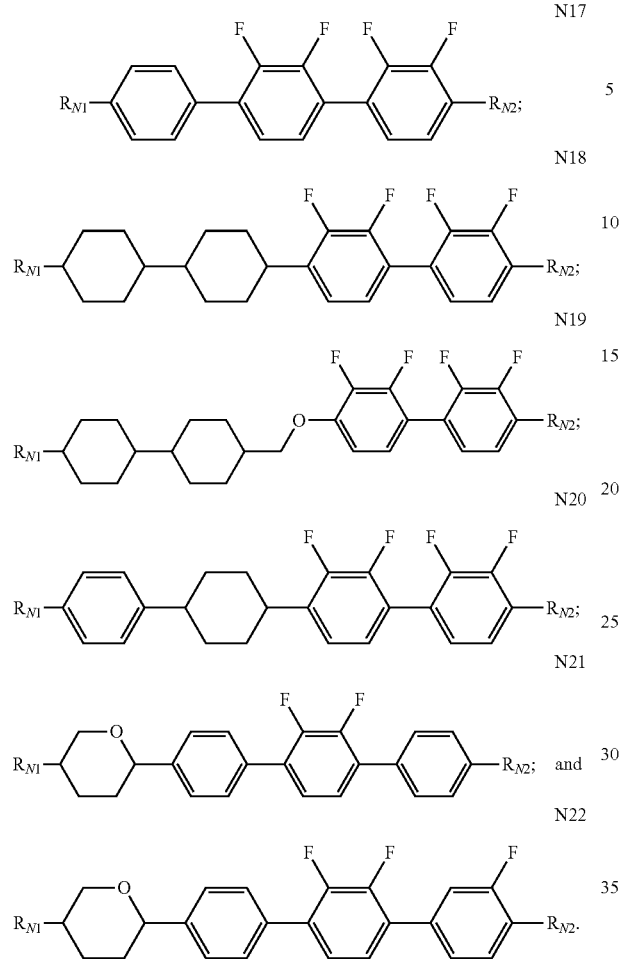

N17

N18

N19

N20

N21

N22 wherein $R_{N1}$ and $R_{N2}$ each independently represents $C_{1-12}$ linear or branched alkyl or alkoxy, or $C_{2-12}$ linear or branched alkenyl or alkenoxy, one or more nonadjacent —$CH_2$— in the $C_{1-2}$ linear or branched alkyl or alkoxy, or the $C_{2-12}$ linear or branched alkenyl or alkenoxy can each be independently replaced by —C≡C—, —O—, —CO—, —CO—O— or —O—CO—.

8. The liquid crystal composition according to claim 1, wherein the compound of general Formula N is 0.1%-50% by weight of the total weight of the liquid crystal composition.

9. The liquid crystal composition according to claim 1, wherein the compound of general Formula M is selected form a group consisting of the following compounds:

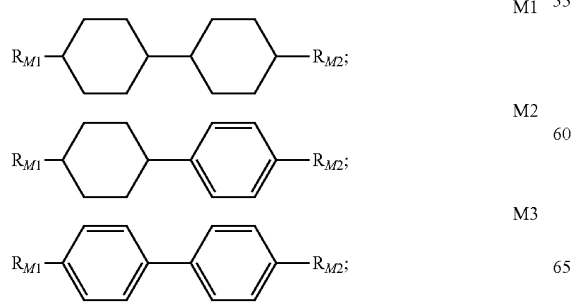

M1

M2

M3

-continued

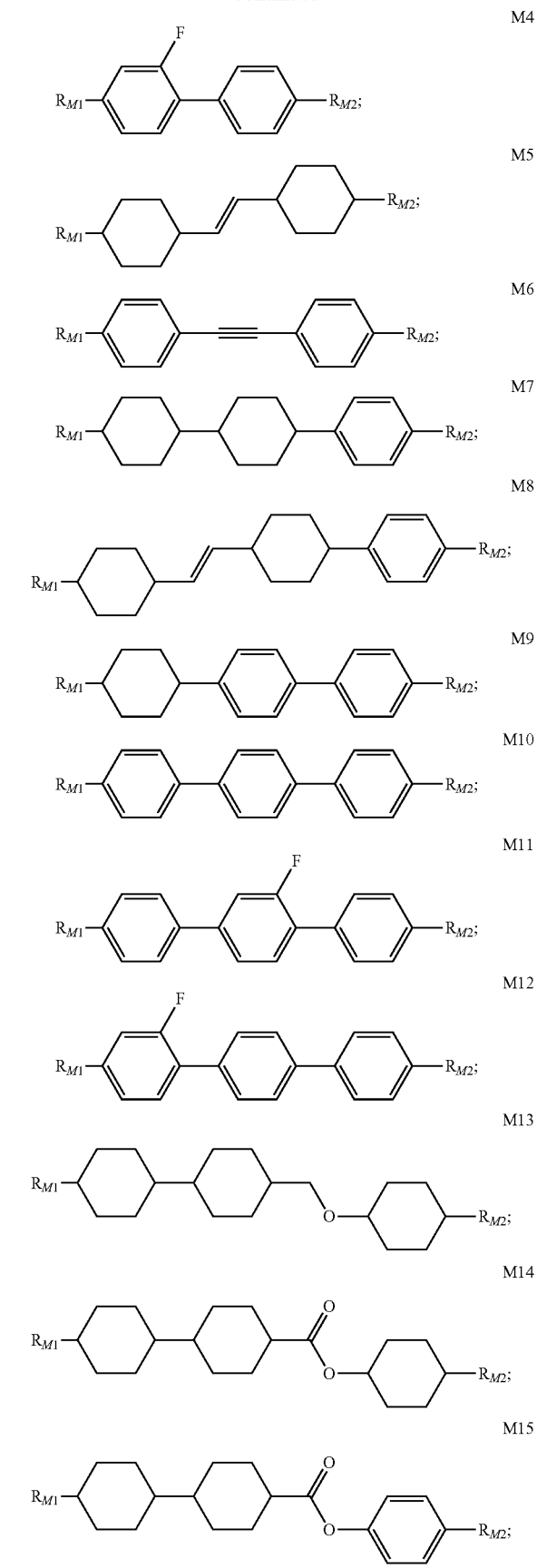

M4

M5

M6

M7

M8

M9

M10

M11

M12

M13

M14

M15

-continued

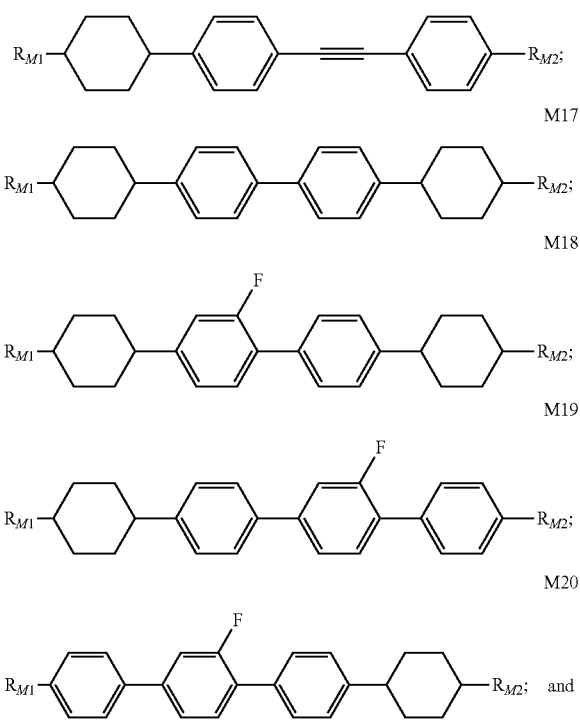

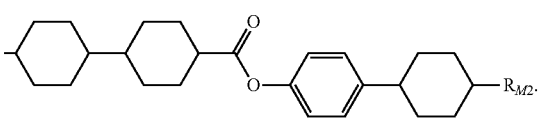

wherein $R_{M1}$ and $R_{M2}$ each independently represents —H, —F,

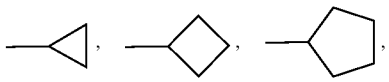

$C_{1-12}$ linear or branched halogenated or unhalogenated alkyl or alkoxy, or $C_{2-12}$ linear or branched halogenated or unhalogenated alkenyl or alkenoxy, one or more nonadjacent —CH$_2$— in the $C_{1-12}$ linear or branched halogenated or unhalogenated alkyl or alkoxy, or the $C_{2-12}$ linear or branched halogenated or unhalogenated alkenyl or alkenoxy can each be independently replaced by —C≡C—, —O—, —CO—, —CO—O— or —O—CO—.

10. The liquid crystal composition according to claim 9, wherein the compound of general Formula M is 1%-80% by weight of the total weight of the liquid crystal composition.

11. A liquid crystal display device comprising the liquid crystal composition according to claim 1.

* * * * *